(12) United States Patent
Quattrini, Jr. et al.

(10) Patent No.: US 12,703,262 B2
(45) Date of Patent: *Aug. 11, 2026

(54) DYNAMIC ALLOCATION OF POWER MODULES FOR CHARGING ELECTRIC VEHICLES

(71) Applicant: ChargePoint, Inc., Campbell, CA (US)

(72) Inventors: Richard J. Quattrini, Jr., San Jose, CA (US); Peter Vaughan, Los Gatos, CA (US); David Baxter, Monte Sereno, CA (US); Carl F. Hagenmaier, Jr., Los Altos, CA (US); Patrick Kien Tran, Tracy, CA (US); Craig T. Matsuno, San Jose, CA (US); Gary A. Eldridge, San Jose, CA (US); Pasquale Romano, Los Gatos, CA (US)

(73) Assignee: CHARGEPOINT, INC., Campbell, CA (US)

( * ) Notice: Subject to any disclaimer, the term of this patent is extended or adjusted under 35 U.S.C. 154(b) by 749 days.

This patent is subject to a terminal disclaimer.

(21) Appl. No.: 17/505,573

(22) Filed: Oct. 19, 2021

(65) Prior Publication Data

US 2023/0117407 A1    Apr. 20, 2023

Related U.S. Application Data

(60) Continuation of application No. 16/995,613, filed on Aug. 17, 2020, now Pat. No. 11,148,551, which is a (Continued)

(51) Int. Cl.

*B60L 53/62* (2019.01)
*B60L 53/63* (2019.01)

(Continued)

(52) U.S. Cl.

CPC ............... *B60L 53/63* (2019.02); *B60L 53/62* (2019.02); *H02J 7/0013* (2013.01); *B60L 53/11* (2019.02);

(Continued)

(58) Field of Classification Search

CPC .......... B60L 53/62; B60L 53/63; B60L 53/11; B60L 53/67; B60L 58/24; H02J 7/0013;

(Continued)

(56) References Cited

U.S. PATENT DOCUMENTS

| | | | | |
|---|---|---|---|---|
| 3,824,813 | A | 7/1974 | Davis | |
| 4,849,682 | A * | 7/1989 | Bauer ................ | H02J 7/00036 320/152 |

(Continued)

FOREIGN PATENT DOCUMENTS

| | | | |
|---|---|---|---|
| CN | 104241720 | A | 12/2014 |
| CN | 104539030 | A | 4/2015 |

(Continued)

OTHER PUBLICATIONS

Advisory Action (PTOL-303) Mailed on Feb. 1, 2021 for U.S. Appl. No. 16/215,411.

(Continued)

*Primary Examiner* — John T Trischler

(74) *Attorney, Agent, or Firm* — NICHOLSON DE VOS WEBSTER & ELLIOTT LLP

(57) ABSTRACT

A first dispenser receives a request to initiate charging service for charging an electric vehicle. The first dispenser determines an amount of power that is available for the charging service for charging the electric vehicle including determining an availability status of multiple power modules that are located in the first dispenser and a second dispenser. The first dispenser determines whether the available amount of power is enough to meet a requested or determined (Continued)

amount of power draw of the electric vehicle. If the available amount of power is not enough to meet the requested or determined amount of power draw of the electric vehicle, and if there is at least one of the power modules that is available, the first dispenser requests allocation of the available power module and charging service commences.

18 Claims, 8 Drawing Sheets

Related U.S. Application Data division of application No. 15/605,857, filed on May 25, 2017, now Pat. No. 10,744,883.

(60) Provisional application No. 62/341,567, filed on May 25, 2016.

(51) Int. Cl.
*H02J 7/00* (2006.01)
*B60L 53/10* (2019.01)
*B60L 53/67* (2019.01)

(52) U.S. Cl.
CPC ............ *B60L 53/67* (2019.02); *Y02T 10/7072* (2013.01); *Y02T 90/12* (2013.01)

(58) Field of Classification Search
CPC ......... H02J 7/02; H02J 2310/48; Y02T 10/70; Y02T 10/7072; Y02T 90/12
USPC .......................................................... 320/109
See application file for complete search history.

(56) References Cited

U.S. PATENT DOCUMENTS 5,307,001 A 4/1994 Heavey
5,327,066 A 7/1994 Smith
5,462,439 A * 10/1995 Keith ........................ B60L 1/12 439/246
5,550,465 A 8/1996 Yamamoto et al.
5,565,755 A * 10/1996 Keith ...................... B60L 53/16 219/202
5,569,993 A * 10/1996 Keith .................... B60L 53/305 318/560
5,572,109 A * 11/1996 Keith .................... H02J 7/0045 439/246
5,594,318 A 1/1997 Nor et al.
5,598,084 A * 1/1997 Keith ...................... B60L 53/64 235/382
5,656,916 A 8/1997 Hotta
5,696,367 A 12/1997 Keith
5,742,229 A * 4/1998 Smith .................... G06Q 30/02 340/439
5,814,972 A 9/1998 Shimada et al.
5,982,596 A 11/1999 Spencer et al.
6,005,758 A * 12/1999 Spencer ................. H02H 3/006 361/64
6,018,293 A * 1/2000 Smith ................. G07F 17/0014 340/439
6,067,008 A 5/2000 Smith
6,087,805 A 7/2000 Langston et al.
6,114,775 A 9/2000 Chung et al.
6,114,833 A * 9/2000 Langston ................ B60L 58/15 320/109
6,137,070 A 10/2000 Montague et al.
6,157,527 A * 12/2000 Spencer ................... H02H 3/04 361/64
6,212,049 B1 * 4/2001 Spencer ................. H02H 3/006 361/64
6,225,776 B1 5/2001 Chai
6,614,204 B2 9/2003 Pellegrino et al.
6,646,561 B1 11/2003 Zur et al.
6,680,547 B1 1/2004 Dailey
6,936,936 B2 * 8/2005 Fischer ................. H02J 7/0045
7,071,698 B2 7/2006 Furukawa et al.
7,239,111 B2 * 7/2007 Fischer .............. H01R 13/6675 320/111
7,256,516 B2 8/2007 Buchanan et al.
7,453,233 B2 * 11/2008 Fischer ..................... H02J 7/02 320/111
7,486,034 B2 2/2009 Nakamura et al.
7,494,729 B2 * 2/2009 Odaohhara ....... H01M 10/4207 320/135
7,525,291 B1 4/2009 Ferguson
7,528,582 B1 * 5/2009 Ferguson ............. H02J 7/0047 320/128
7,602,143 B2 10/2009 Capizzo
7,642,670 B2 * 1/2010 Rosendahl ............. B60L 53/30 307/9.1
7,719,284 B2 5/2010 Ohta et al.
7,737,657 B2 * 6/2010 Fischer ..................... H02J 7/02 320/111
7,746,049 B2 6/2010 Sato
7,759,906 B2 * 7/2010 Ferguson ............. H02J 7/0047 320/128
7,759,907 B2 * 7/2010 Ferguson .......... H02J 7/007182 320/128
7,768,229 B2 * 8/2010 Zhang ..................... B60L 58/18 307/66
7,812,469 B2 10/2010 Asada
7,834,586 B2 * 11/2010 Fischer ................ H02J 7/0045 320/107
7,834,613 B2 11/2010 Ziegler et al.
7,876,071 B2 1/2011 Chen et al.
7,921,315 B2 * 4/2011 Langgood ................. H02J 3/14 713/340
7,986,127 B2 * 7/2011 Fischer ................ H02J 7/0045 320/111
8,013,570 B2 9/2011 Baxter et al.
8,035,341 B2 * 10/2011 Genzel .................... B60L 53/65 320/109
8,164,302 B2 * 4/2012 Capizzo ................ B60L 53/305 320/109
8,169,187 B2 * 5/2012 Fischer ..................... H02J 7/02 320/111
8,188,710 B2 * 5/2012 Ichikawa ............. H02J 7/1423 320/109
8,193,779 B2 * 6/2012 Ferguson .......... H02J 7/007182 320/128
8,232,766 B2 * 7/2012 Fischer ..................... H02J 7/02 320/111
8,258,743 B2 * 9/2012 Tyler ....................... B60L 53/11 320/140
8,314,511 B2 * 11/2012 Schuler ................... H02J 9/002 307/31
8,368,349 B2 * 2/2013 Zyren ................... H02J 7/0042 340/13.23
8,374,729 B2 2/2013 Chapel et al.
8,400,107 B2 * 3/2013 Taguchi .................. B60L 53/14 320/109
8,410,755 B2 4/2013 Chau
8,461,804 B1 * 6/2013 Capizzo .................. B60L 53/66 320/109
8,502,500 B2 8/2013 Baxter et al.
8,504,217 B2 * 8/2013 Nilsen ..................... G06F 1/324 700/295
8,531,162 B2 * 9/2013 Hafner .................. B60L 53/305 705/72
8,571,118 B2 * 10/2013 Zyren ................... H02J 7/0042 375/257
8,624,550 B2 * 1/2014 Fischer ................. H02J 7/0045 320/111
8,643,330 B2 * 2/2014 Nergaard .............. H02J 7/0013 320/109
8,731,130 B2 5/2014 Reyes et al.
8,731,730 B2 5/2014 Watkins et al.
8,766,595 B2 7/2014 Gaul et al.

(56) References Cited

U.S. PATENT DOCUMENTS 8,810,192 B2* 8/2014 Bridges .............. G06Q 30/0202 705/72
8,810,198 B2* 8/2014 Nergaard ................ B60L 53/63 320/109
8,841,885 B2* 9/2014 Ibe .......................... H02J 7/005 320/155
8,872,379 B2* 10/2014 Ruiz ....................... B60L 1/003 307/66
8,890,474 B2* 11/2014 Kim ........................ B60L 53/65 320/109
8,897,924 B2* 11/2014 Nilsen ..................... G06F 1/324 307/29
8,935,011 B2 1/2015 Tischer
8,952,656 B2 2/2015 Tse
8,957,634 B2* 2/2015 Lo ......................... H02J 7/0013 700/286
9,020,771 B1 4/2015 Hardy
9,061,597 B2 6/2015 Oda et al.
9,090,175 B2* 7/2015 Bianco ...................... H02J 3/14
9,093,724 B2* 7/2015 Fujitake ................ H01M 10/44
9,148,027 B2* 9/2015 Shane ............... H02J 13/00024
9,160,168 B2* 10/2015 Chapel ............. H02J 13/00004
9,168,841 B2 10/2015 Kawai et al.
9,201,407 B2* 12/2015 Baxter .................... B60L 55/00
9,201,408 B2 12/2015 Baxter et al.
9,209,638 B2* 12/2015 Bouman ................. B60L 53/20
9,290,104 B2 3/2016 Gadh et al.
9,315,109 B2* 4/2016 Marathe .................. B60L 58/21
9,371,008 B2* 6/2016 Bouman ................. B60L 53/11
9,379,556 B2* 6/2016 Haensgen ............. H02J 50/001
9,397,515 B2* 7/2016 Tischer ..................... H02J 3/14
9,436,948 B2* 9/2016 Bridges ................... H02J 7/007
9,457,672 B2* 10/2016 Chang ..................... B60L 53/31
9,469,211 B2 10/2016 Baxter et al.
9,483,737 B2* 11/2016 Sanchez Loureda .... G06N 7/01
9,493,082 B1* 11/2016 Tse .......................... B60L 53/14
9,493,087 B2 11/2016 Leary
9,505,318 B2 11/2016 Hendrix et al.
9,575,533 B2* 2/2017 Watkins .................. B60L 53/34
9,623,762 B2 4/2017 Park
9,656,567 B2 5/2017 Kothavale et al.
9,698,598 B2 7/2017 Ballatine et al.
9,698,616 B2* 7/2017 Mohagheghi ..... H02J 13/00034
9,762,134 B2* 9/2017 Deboy .............. H02M 3/33592
9,766,671 B2 9/2017 Dorn et al.
9,804,624 B2* 10/2017 Johansson ............... B60L 53/31
9,843,187 B2* 12/2017 Uyeki ............... H02J 13/00001
9,853,488 B2* 12/2017 Fincham ............... B60L 53/665
9,878,629 B2* 1/2018 Lowenthal .............. B60L 53/65
9,902,276 B2* 2/2018 Bianco .................... B60L 53/31
9,908,421 B2 3/2018 Koolen et al.
9,908,427 B2* 3/2018 Baxter .................. B60L 53/665
9,933,803 B2* 4/2018 Johansson ............... B60L 53/18
9,958,925 B2* 5/2018 Chapel ...................... H02J 3/14
10,011,183 B2* 7/2018 Shimizu .................. B60L 53/65
10,040,363 B2* 8/2018 Beaston .................. H02J 3/322
10,050,441 B2* 8/2018 Chapel ....................... G05F 1/66
10,069,319 B2* 9/2018 Greening ............. H02J 7/0071
10,090,567 B2* 10/2018 Austin .................... B60L 53/68
10,093,193 B2* 10/2018 Ohkuma ............... B60L 53/305
10,126,796 B2* 11/2018 Dorn ....................... B60L 53/63
10,131,239 B2* 11/2018 Herke ..................... B60L 53/14
10,131,242 B2* 11/2018 Marathe .................. B60L 53/65
10,150,380 B2 12/2018 Vaughan et al.
10,173,544 B2* 1/2019 Hendrix ................ B60L 53/305
10,189,359 B2* 1/2019 Lowenthal ............. B60L 53/63
10,193,368 B2* 1/2019 Zhang ..................... H02M 1/44
10,252,633 B2 4/2019 Baxter et al.
10,272,791 B2 4/2019 Chen et al.
10,279,698 B2* 5/2019 Bridges .............. G06Q 30/0202
10,291,050 B2* 5/2019 Zhang ....................... H02J 7/04
10,391,870 B2* 8/2019 Götz ....................... B60L 53/62
10,431,996 B2* 10/2019 Liu ..................... H01M 10/441
10,464,435 B2* 11/2019 Kothavale ................ H02J 3/14
10,549,645 B2* 2/2020 Zhao ..................... B60L 53/305
10,569,659 B2* 2/2020 Tsuno ..................... B60L 55/00
10,576,826 B2* 3/2020 Ellgas ................... H02J 7/0013
10,620,679 B2* 4/2020 Sultenfuss ............ H02J 7/0063
10,630,096 B2* 4/2020 Zhang ................... H02J 7/0071
10,661,659 B2* 5/2020 Silorio .................... B60L 53/64
10,666,062 B2* 5/2020 Greening .................. H02J 7/00
10,698,469 B2* 6/2020 Chapel ...................... H02J 3/00
10,744,883 B2 8/2020 Quattrini et al.
10,762,490 B2* 9/2020 Marathe .................. B60L 53/65
10,807,485 B2* 10/2020 Koolen ................... B60L 53/62
10,819,135 B2* 10/2020 Ambroziak ............. B60L 53/14
10,873,212 B2* 12/2020 Lagnado ................. H02J 50/10
10,906,423 B2* 2/2021 Bridges ................... B60L 53/52
10,913,370 B2* 2/2021 Kubota ..................... H02J 3/14
10,913,372 B2* 2/2021 Baxter .................. H02J 7/0013
10,919,403 B2* 2/2021 Ge ........................ H02J 7/0024
10,926,655 B2* 2/2021 Li ........................... B60L 53/22
10,953,760 B2* 3/2021 Kothavale ................. B60L 3/12
10,998,734 B2* 5/2021 Zhang ....................... H02J 7/04
10,998,753 B2* 5/2021 Ambroziak ........... B60L 53/126
11,007,885 B2 5/2021 Koolen et al.
11,135,940 B2* 10/2021 Quattrini, Jr. ........... B60L 53/11
11,148,551 B2* 10/2021 Quattrini, Jr. ........... B60L 58/12
11,155,174 B2* 10/2021 Silorio .................... B60L 53/14
11,171,509 B2 11/2021 Lee et al.
11,180,034 B2* 11/2021 Reynolds .................. H02J 3/14
11,251,471 B2* 2/2022 Austin .................. H01M 10/44
11,258,107 B2* 2/2022 Austin .................... B60L 53/38
11,258,108 B2* 2/2022 Austin .................... B60L 53/38
11,258,109 B2* 2/2022 Austin .................... B60L 53/63
11,258,110 B2* 2/2022 Austin .................. B60L 53/126
11,258,111 B2* 2/2022 Austin .................. B60L 53/305
11,258,112 B2* 2/2022 Austin .................... B60L 53/18
11,264,652 B2* 3/2022 Austin .................. B60L 53/126
11,264,798 B2* 3/2022 Brombach ................ H02J 1/102
11,271,399 B1* 3/2022 Sorenson .................. H02J 1/10
11,283,281 B2* 3/2022 Zhang ............... H02J 7/007182
11,305,661 B2* 4/2022 Heyne ................... H02J 7/0045
11,318,858 B2* 5/2022 Zheng ..................... B60L 53/30
11,342,754 B2* 5/2022 Rao ......................... B60L 53/60
11,345,255 B2* 5/2022 Maruno ................... H02J 3/322
11,349,157 B2* 5/2022 Austin .................... B60L 53/68
11,355,791 B2* 6/2022 Austin .................... B60L 53/14
11,355,792 B2* 6/2022 Austin .................... B60L 53/14
11,376,984 B2* 7/2022 Samojeden ....... H02J 13/00007
11,390,182 B2* 7/2022 Catarino ................ B64U 80/25
11,407,320 B2* 8/2022 Lowenthal .............. B60L 53/14
11,433,772 B2* 9/2022 Vaughan ................. B60L 53/68
11,453,298 B2* 9/2022 Erikson ................... B60L 53/62
11,458,858 B2* 10/2022 Schulze .................. B60L 53/62
11,482,734 B2* 10/2022 Austin .................... B60L 53/68
11,482,735 B2* 10/2022 Austin .................. B60L 53/126
11,482,736 B2* 10/2022 Austin .................... B60L 53/14
11,489,207 B2* 11/2022 Austin .................... B60L 53/38
11,489,208 B2* 11/2022 Austin .................. B60L 53/305
11,508,996 B2* 11/2022 Austin .................... B60L 53/63
11,511,639 B2* 11/2022 Brombach .............. B60L 53/16
11,515,581 B2* 11/2022 Austin .................... B60L 53/68
11,515,582 B2* 11/2022 Austin .................. B60L 53/305
11,548,401 B1* 1/2023 Malli Raghavan ..... B60L 53/65
11,563,338 B1* 1/2023 Ambroziak ........... B60L 53/126
11,565,601 B2* 1/2023 Erikson ................... B60L 53/62
11,575,275 B1* 2/2023 Ambroziak ........... B60L 53/305
11,588,191 B2* 2/2023 Austin .................... B60L 53/38
11,594,767 B2* 2/2023 Austin .................... B60L 53/68
11,594,768 B2* 2/2023 Austin .................. H01M 10/44
11,594,769 B2* 2/2023 Austin .................... B60L 53/63
11,600,867 B2* 3/2023 Austin .................... B60L 53/63
11,605,958 B2* 3/2023 Hwang ............... H02J 7/00032
11,621,442 B2* 4/2023 Austin .................... B60L 53/63 320/109
11,621,444 B2* 4/2023 Austin .................... B60L 53/14 320/109
11,628,739 B2* 4/2023 Erikson ................ B60L 53/305 320/109
11,631,987 B2* 4/2023 Ambroziak ............... B60L 3/12 320/108

(56) References Cited

U.S. PATENT DOCUMENTS 11,710,861 B2* 7/2023 Austin .................... B60L 53/14 320/109
11,710,862 B2* 7/2023 Austin .................. H01M 10/44 320/109
11,718,191 B2* 8/2023 Kothavale ................. H02J 3/00 320/108
11,721,844 B2* 8/2023 Austin .................. B60L 53/305 320/109
11,721,845 B2* 8/2023 Austin .................... B60L 53/38 320/109
11,728,526 B2* 8/2023 Austin .................... B60L 53/14 320/109
11,745,604 B2* 9/2023 Erikson ................. B60L 53/305 320/109
11,749,991 B1* 9/2023 Seroff ................... H02J 7/0013 320/109
11,760,215 B2* 9/2023 Silorio .................... B60L 53/65 320/104
11,770,006 B2* 9/2023 Rao ......................... H02J 3/381 307/22
11,780,345 B2* 10/2023 Baxter .................. B60L 3/0084 320/109
11,801,761 B2* 10/2023 Bouman ................. B60L 53/20
11,807,124 B2* 11/2023 Choi ....................... B60L 53/68
11,813,959 B2* 11/2023 Quattrini, Jr. ......... B60L 53/665
11,868,927 B2* 1/2024 Erikson ................... B60L 53/67
11,888,127 B2* 1/2024 Austin .................... B60L 53/68
11,890,951 B2* 2/2024 Erikson ................... B60L 53/67
11,901,522 B2* 2/2024 Austin .................. B60L 53/305
11,901,523 B2* 2/2024 Austin .................... B60L 53/18
11,909,010 B2* 2/2024 Austin .................... B60L 53/68
11,909,011 B2* 2/2024 Austin .................... B60L 53/18
11,938,831 B2* 3/2024 Silorio .................. B60L 53/665
11,951,863 B2* 4/2024 Lowenthal ............ B60L 53/305
11,958,380 B2* 4/2024 Quattrini, Jr. ......... B60L 53/665
11,990,788 B2* 5/2024 Ambroziak ............. B60L 55/00
12,015,128 B2* 6/2024 Austin .................... B60L 53/68
12,015,129 B2* 6/2024 Austin .................... B60L 53/68
12,017,554 B2* 6/2024 Malli Raghavan ... B60L 53/305
12,057,731 B2* 8/2024 Zhang ................... H02J 7/0071
12,062,901 B2* 8/2024 Rao ........................... H02J 3/02
12,080,859 B2* 9/2024 Austin .................. H01M 10/44
12,087,921 B2* 9/2024 Austin .................. B60L 53/305
12,149,079 B2* 11/2024 Seroff ..................... B60L 53/68
12,157,387 B2* 12/2024 Vaughan ................. B60L 53/67
12,199,461 B2* 1/2025 Matsumura .............. G06N 3/08
12,221,010 B2* 2/2025 Quattrini, Jr. ........... B60L 53/65
2003/0052547 A1 3/2003 Fischer et al.
2003/0120442 A1* 6/2003 Pellegrino ............. G07F 15/005 702/63
2004/0042138 A1 3/2004 Saito et al.
2004/0130292 A1 7/2004 Buchanan et al.
2004/0189251 A1 9/2004 Kutkut et al.
2005/0099131 A1 5/2005 Amarillas et al.
2005/0116686 A1* 6/2005 Odaohhara ........... H02J 7/0013 320/116
2005/0245138 A1* 11/2005 Fischer ..................... H02J 7/02 439/638
2006/0108971 A1 5/2006 Ono
2007/0113921 A1* 5/2007 Capizzo .................. B60L 53/80 141/231
2007/0216353 A1* 9/2007 Fischer ................. H02J 7/0045 320/111
2008/0067974 A1* 3/2008 Zhang ..................... B60L 53/63 903/907
2008/0082180 A1 4/2008 Blevins et al.
2009/0021213 A1 1/2009 Johnson
2009/0040029 A1 2/2009 Bridges et al.
2009/0045676 A1 2/2009 Rosendahl
2009/0058359 A1* 3/2009 Fischer ............. H01R 13/6675 320/111
2009/0066287 A1 3/2009 Pollack et al.
2009/0200988 A1* 8/2009 Bridges ................... B60L 55/00 320/137
2009/0206794 A1* 8/2009 Ferguson .......... H02J 7/007182 320/128
2009/0212741 A1* 8/2009 Ferguson .................. H02J 7/04 320/164
2009/0261779 A1 10/2009 Zyren
2009/0282274 A1 11/2009 Langgood et al.
2009/0290650 A1* 11/2009 Zyren .................... G06Q 50/06 375/257
2009/0313098 A1 12/2009 Hafner et al.
2009/0314382 A1* 12/2009 Capizzo ............... B60K 15/063 141/2
2010/0017249 A1 1/2010 Fincham et al.
2010/0026237 A1 2/2010 Ichikawa et al.
2010/0039062 A1 2/2010 Gu et al.
2010/0066170 A1 3/2010 Schuler
2010/0106631 A1 4/2010 Kurayama et al.
2010/0134067 A1 6/2010 Baxter et al.
2010/0141204 A1 6/2010 Tyler et al.
2010/0145542 A1* 6/2010 Chapel ...................... H02J 3/14 700/295
2010/0148724 A1* 6/2010 Fischer ................. H02J 7/0045 320/114
2010/0171463 A9* 7/2010 Fischer ..................... H02J 7/02 320/111
2010/0181957 A1 7/2010 Goeltner
2010/0198440 A1 8/2010 Fujitake
2010/0211643 A1* 8/2010 Lowenthal ............. B60L 53/14 709/206
2010/0277125 A1* 11/2010 Ferguson .......... H02J 7/007182 320/128
2010/0315043 A1* 12/2010 Chau ....................... B60L 58/10 320/134
2011/0025262 A1* 2/2011 Fischer ................ H01R 31/065 320/107
2011/0050164 A1 3/2011 Partovi et al.
2011/0057613 A1* 3/2011 Taguchi .................. B60L 53/65 320/109
2011/0066515 A1 3/2011 Horvath et al.
2011/0074351 A1 3/2011 Bianco et al.
2011/0133693 A1* 6/2011 Lowenthal ............. B60L 53/65 320/109
2011/0140657 A1 6/2011 Genzel et al.
2011/0175569 A1 7/2011 Austin
2011/0184579 A1 7/2011 Nilsen et al.
2011/0204720 A1* 8/2011 Ruiz ..................... B60L 53/305 307/66
2011/0279080 A1* 11/2011 Fischer ................ H01R 31/065 320/107
2011/0285345 A1 11/2011 Kawai et al.
2011/0285346 A1* 11/2011 Fischer ................. H02J 7/0045 320/107
2011/0291616 A1 12/2011 Kim et al.
2011/0316482 A1* 12/2011 Baxter .................... B60L 50/40 320/109
2012/0013302 A1* 1/2012 Genzel .................. B60L 53/305 320/109
2012/0095610 A1* 4/2012 Chapel ...................... G05F 1/66 700/297
2012/0146583 A1* 6/2012 Gaul ....................... H02J 3/322 320/109
2012/0173033 A1* 7/2012 Tischer ................. H02J 7/0013 700/295
2012/0197693 A1* 8/2012 Karner ................. G06Q 20/102 705/14.1
2012/0200256 A1 8/2012 Tse
2012/0221160 A1* 8/2012 Hafner .................... B60L 53/65 700/295
2012/0223675 A1* 9/2012 Bianco ...................... H02J 3/14 320/109
2012/0235646 A1* 9/2012 Lo ......................... H02J 7/0013 320/137
2012/0277927 A1* 11/2012 Watkins .................. B60L 53/68 700/297
2012/0293113 A1* 11/2012 Fischer ............. H01R 13/6675 320/107

(56) References Cited

U.S. PATENT DOCUMENTS

2012/0326668 A1 12/2012 Ballatine et al.
2012/0330494 A1 12/2012 Hendrix et al.
2013/0049677 A1 2/2013 Bouman
2013/0057209 A1 3/2013 Nergaard et al.
2013/0057210 A1* 3/2013 Nergaard ................ B60L 53/11 320/109
2013/0069588 A1* 3/2013 Oda ....................... B60L 53/11 320/109
2013/0069592 A1 3/2013 Bouman
2013/0099743 A1* 4/2013 Zyren .................. H02J 7/0013 320/109
2013/0124320 A1* 5/2013 Karner ................... B60L 50/30 705/14.57
2013/0127416 A1 5/2013 Karner et al.
2013/0127417 A1* 5/2013 Karner ................... B60L 50/30 320/109
2013/0151293 A1* 6/2013 Karner ................... B60L 53/65 705/5
2013/0181680 A1 7/2013 Chau
2013/0187602 A1* 7/2013 Bouman ................ B60L 53/20 320/109
2013/0211988 A1* 8/2013 Dorn ...................... B60L 53/65 700/297
2013/0257146 A1 10/2013 Nojima et al.
2013/0305071 A1* 11/2013 Nilsen .................... G06F 1/324 713/323
2013/0310999 A1 11/2013 Baxter et al.
2014/0009119 A1* 1/2014 Ibe .......................... H02J 7/00 320/134
2014/0025221 A1* 1/2014 Chapel ............. H02J 13/00002 700/295
2014/0028254 A1 1/2014 Shane et al.
2014/0032003 A1* 1/2014 Chapel .................. G05B 15/02 700/295
2014/0062401 A1* 3/2014 Gadh ..................... B60L 53/67 320/109
2014/0067183 A1 3/2014 Sisk
2014/0103866 A1 4/2014 Kothavale et al.
2014/0172772 A1* 6/2014 Sanchez Loureda .... G01D 4/00 706/52
2014/0214224 A1* 7/2014 Watkins ................. B60L 53/65 700/297
2014/0247019 A1* 9/2014 Park ......................... B60L 3/04 320/160
2014/0266046 A1* 9/2014 Baxter ................... B60L 53/63 320/109
2014/0266240 A1* 9/2014 Haensgen ............ H02J 50/001 307/104
2014/0285154 A1* 9/2014 Mohagheghi ..... H02J 13/00017 307/65
2014/0320083 A1 10/2014 Masuda et al.
2015/0015190 A1* 1/2015 Tischer .................... H02J 7/00 320/152
2015/0042278 A1* 2/2015 Leary ....................... B60L 1/02 901/30
2015/0077056 A1* 3/2015 Bridges .................. H02J 3/008 705/7.29
2015/0123613 A1 5/2015 Koolen et al.
2015/0123619 A1 5/2015 Marathe et al.
2015/0153714 A1 6/2015 Ho
2015/0165917 A1 6/2015 Robers et al.
2015/0202973 A1* 7/2015 Chang .................... B60L 53/63 320/109
2015/0255994 A1 9/2015 Kesler et al.
2015/0298564 A1* 10/2015 Johansson ............... B60L 53/14 320/109
2015/0301547 A1 10/2015 Johansson
2015/0326040 A1 11/2015 Kawai et al.
2016/0072394 A1* 3/2016 Deboy ................. H02M 7/217 363/21.1
2016/0082856 A1* 3/2016 Baxter ................... B60L 53/64 320/109
2016/0111874 A1* 4/2016 Chapel ...................... G06F 1/28 700/295
2016/0114692 A1* 4/2016 Tripathi ................. B60L 58/21 320/109
2016/0114693 A1 4/2016 Tsuno
2016/0126732 A1 5/2016 Uyeki
2016/0193934 A1* 7/2016 Marathe ................. B60L 53/14 320/137
2016/0344218 A1* 11/2016 Zhang ..................... H02M 1/44
2016/0347195 A1* 12/2016 Bridges .................. B60L 53/64
2016/0375781 A1 12/2016 Herke et al.
2017/0012451 A1* 1/2017 Zhang ...................... H02J 7/02
2017/0036558 A1* 2/2017 Baxter ...................... B60L 3/12
2017/0057369 A1 3/2017 Nsje et al.
2017/0106764 A1 4/2017 Beaston et al.
2017/0182900 A1* 6/2017 Ohkuma ................ B60L 53/50
2017/0246961 A1* 8/2017 Lee .......................... H04B 3/54
2017/0259683 A1* 9/2017 Shimizu ................. B60L 53/63
2017/0264122 A1* 9/2017 Greening ................. H02J 7/00
2017/0274792 A1 9/2017 Vaughan et al.
2017/0317494 A1* 11/2017 Chapel .................. G05B 15/02
2017/0353042 A1 12/2017 Liu
2018/0001779 A1* 1/2018 Kothavale .............. B60L 53/30
2018/0001780 A1 1/2018 Li et al.
2018/0001781 A1* 1/2018 Quattrini, Jr. ......... B60L 53/665
2018/0018007 A1* 1/2018 Dorn ...................... B60L 53/65
2018/0041071 A1* 2/2018 Chapel ............. H02J 13/00028
2018/0050600 A1* 2/2018 Chen .................... B60L 53/305
2018/0065496 A1* 3/2018 Reynolds ................. H02J 3/14
2018/0131221 A1* 5/2018 Ambroziak ........ G06Q 30/0283
2018/0138744 A1* 5/2018 Lagnado ................ H02J 50/10
2018/0141447 A1* 5/2018 Koolen .................. B60L 53/31
2018/0162229 A1* 6/2018 Götz .................... H02J 7/0042
2018/0194240 A1* 7/2018 Baxter ................... B60L 53/64
2018/0205252 A1* 7/2018 Greening ................. H02J 7/00
2018/0212438 A1* 7/2018 Bouman ................ B60L 53/63
2018/0215276 A1* 8/2018 Lowenthal ............. B60L 53/65
2018/0229617 A1* 8/2018 Hendrix ................. B60L 53/60
2018/0241238 A1* 8/2018 Zhang ...................... H02J 7/04
2018/0264966 A1* 9/2018 Kubota ................ H02J 7/0025
2018/0334051 A1* 11/2018 Samojeden ......... H02J 7/00714
2018/0351214 A1* 12/2018 Austin ................... B60L 53/63
2018/0351215 A1* 12/2018 Austin ................. B60L 53/305
2018/0351216 A1* 12/2018 Austin ................. B60L 53/305
2018/0351217 A1* 12/2018 Austin ................. B60L 53/126
2018/0351218 A1* 12/2018 Austin ................... B60L 53/63
2018/0361867 A1* 12/2018 Ellgas ....................... B60L 3/12
2018/0361870 A1* 12/2018 Zhao ...................... B60L 53/68
2018/0370372 A1* 12/2018 Silorio ................ G05B 19/042
2018/0375166 A1* 12/2018 Austin ................. B60L 53/126
2018/0375167 A1* 12/2018 Austin ................... B60L 53/63
2018/0375168 A1* 12/2018 Austin ................. B60L 53/126
2018/0375169 A1* 12/2018 Austin ................... B60L 53/38
2018/0375170 A1* 12/2018 Austin .................. H01M 10/44
2018/0375171 A1* 12/2018 Austin ................... B60L 53/38
2018/0375172 A1* 12/2018 Austin ................... B60L 53/38
2018/0375173 A1* 12/2018 Austin ................. B60L 53/305
2018/0375174 A1* 12/2018 Austin ................. B60L 53/126
2018/0375175 A1* 12/2018 Austin ................... B60L 53/14
2019/0054831 A1* 2/2019 Marathe ................. B60L 53/65
2019/0073012 A1* 3/2019 Sultenfuss ........... H02J 7/0068
2019/0123573 A1* 4/2019 Zhang ..................... H02M 1/44
2019/0148785 A1* 5/2019 Austin ................... B60L 53/68 320/109
2019/0148786 A1* 5/2019 Austin ................... B60L 53/14 320/109
2019/0148787 A1* 5/2019 Austin ................... B60L 53/63 320/109
2019/0148788 A1* 5/2019 Austin ................... B60L 53/38 320/109
2019/0148789 A1* 5/2019 Austin ................... B60L 53/38 320/109
2019/0148790 A1* 5/2019 Austin ................... B60L 53/63 320/109
2019/0148791 A1* 5/2019 Austin ................... B60L 53/63 320/109
2019/0148792 A1* 5/2019 Austin ................... B60L 53/68 320/109

(56) References Cited

U.S. PATENT DOCUMENTS

2019/0148793 A1* 5/2019 Austin ........ B60L 53/14 320/109
2019/0148794 A1* 5/2019 Austin ........ B60L 53/305 320/109
2019/0152339 A1* 5/2019 Lowenthal ........ B60L 3/12
2019/0165431 A1* 5/2019 Austin ........ B60L 53/63
2019/0217734 A1* 7/2019 Li ........ B60L 53/14
2019/0222049 A1* 7/2019 Zhang ........ H02M 1/44
2019/0344682 A1* 11/2019 Ge ........ B60L 53/14
2019/0375308 A1 12/2019 Vaughan et al.
2020/0006963 A1* 1/2020 Liu ........ H01M 10/441
2020/0039378 A1* 2/2020 Heyne ........ B60L 53/53
2020/0055418 A1* 2/2020 Bridges ........ B60L 55/00
2020/0101859 A1* 4/2020 Baxter ........ B60L 53/305
2020/0112199 A1* 4/2020 Rao ........ H02H 3/20
2020/0139827 A1* 5/2020 Koolen ........ B60L 53/63
2020/0189406 A1* 6/2020 Kothavale ........ B60L 53/65
2020/0259336 A1* 8/2020 Rao ........ H02B 1/056
2020/0290471 A1* 9/2020 Schulze ........ B60L 53/62
2020/0353825 A1* 11/2020 Silorio ........ B60L 53/665
2020/0376980 A1* 12/2020 Quattrini, Jr. ........ H02J 7/0013
2020/0376981 A1* 12/2020 Quattrini, Jr. ........ B60L 53/63
2020/0391614 A1* 12/2020 Maruno ........ B60L 53/63
2020/0395636 A1* 12/2020 Austin ........ B60L 53/14
2020/0395637 A1* 12/2020 Austin ........ B60L 53/63
2020/0395638 A1* 12/2020 Austin ........ B60L 53/38
2020/0403437 A1* 12/2020 Ambroziak ........ B60L 55/00
2021/0101500 A1* 4/2021 Brombach ........ B60L 53/67
2021/0126296 A1* 4/2021 Austin ........ B60L 53/68
2021/0129701 A1* 5/2021 Brombach ........ H02J 7/00
2021/0135295 A1* 5/2021 Austin ........ B60L 53/305
2021/0135296 A1* 5/2021 Austin ........ B60L 53/68
2021/0162881 A1* 6/2021 Baxter ........ G05B 13/02
2021/0184275 A1* 6/2021 Austin ........ B60L 53/63
2021/0226455 A1* 7/2021 Zhang ........ H02J 7/02
2021/0234205 A1* 7/2021 Austin ........ B60L 53/305
2021/0237610 A1* 8/2021 Zheng ........ H02J 7/00302
2021/0273478 A1* 9/2021 Ambroziak ........ B60L 3/12
2021/0347267 A1* 11/2021 Erikson ........ B60L 53/65
2021/0347269 A1* 11/2021 Kothavale ........ H02J 7/0013
2021/0347273 A1* 11/2021 Erikson ........ B60L 53/67
2021/0347279 A1* 11/2021 Erikson ........ H02J 7/0019
2021/0347280 A1* 11/2021 Erikson ........ B60L 53/30
2021/0350298 A1* 11/2021 Erikson ........ G06Q 20/145
2022/0024345 A1* 1/2022 Quattrini, Jr. ........ H02J 7/0013
2022/0024346 A1* 1/2022 Quattrini, Jr. ........ B60L 53/665
2022/0045530 A1* 2/2022 Silorio ........ B60L 53/14
2022/0080850 A1* 3/2022 Reynolds ........ H02J 3/14
2022/0140634 A1* 5/2022 Zhang ........ H02M 1/44 320/107
2022/0141143 A1* 5/2022 Catarino ........ B60L 53/51 370/254
2022/0153162 A1* 5/2022 Choi ........ G06Q 10/02
2022/0166240 A1* 5/2022 Hwang ........ H02J 7/00304
2022/0200066 A1* 6/2022 Austin ........ B60L 53/68
2022/0209313 A1* 6/2022 Austin ........ B60L 53/68
2022/0209314 A1* 6/2022 Austin ........ B60L 53/38
2022/0209315 A1* 6/2022 Austin ........ B60L 53/126
2022/0209316 A1* 6/2022 Austin ........ B60L 53/14
2022/0209317 A1* 6/2022 Austin ........ B60L 53/126
2022/0209318 A1* 6/2022 Austin ........ B60L 53/63
2022/0212551 A1* 7/2022 Bouman ........ H02J 7/00
2022/0216529 A1* 7/2022 Austin ........ B60L 53/18
2022/0216530 A1* 7/2022 Austin ........ B60L 53/305
2022/0216531 A1* 7/2022 Austin ........ H01M 10/44
2022/0216532 A1* 7/2022 Austin ........ B60L 53/126
2022/0216697 A1* 7/2022 Rao ........ B60L 53/60
2022/0224135 A1* 7/2022 Matsumura ........ H02J 7/0071
2022/0238928 A1* 7/2022 Austin ........ B60L 53/305
2022/0238929 A1* 7/2022 Austin ........ B60L 53/14
2022/0238930 A1* 7/2022 Austin ........ B60L 53/14
2022/0238931 A1* 7/2022 Austin ........ B60L 53/14
2022/0246999 A1* 8/2022 Austin ........ B60L 53/305
2022/0247000 A1* 8/2022 Austin ........ B60L 53/14
2022/0258643 A1* 8/2022 Boxwell ........ B60L 53/62
2022/0302740 A1* 9/2022 Ambroziak ........ G06Q 30/0283
2022/0332207 A1* 10/2022 Samojeden ........ H02J 3/28
2022/0348103 A1* 11/2022 Catarino ........ B60L 53/30
2022/0371465 A1* 11/2022 Lowenthal ........ B60L 3/12
2022/0402376 A1* 12/2022 Erikson ........ B60L 53/305
2022/0410734 A1* 12/2022 Vaughan ........ B60L 53/68
2023/0012593 A1* 1/2023 Austin ........ B60L 53/63
2023/0013807 A1* 1/2023 Austin ........ B60L 53/14
2023/0014364 A1* 1/2023 Austin ........ B60L 53/18
2023/0016705 A1* 1/2023 Austin ........ B60L 53/18
2023/0020418 A1* 1/2023 Austin ........ B60L 53/126
2023/0170541 A1* 6/2023 Austin ........ B60L 53/68 320/109
2023/0207906 A1* 6/2023 Austin ........ B60L 53/68 320/109
2023/0211680 A1* 7/2023 Silorio ........ G05B 19/042 700/295
2023/0352963 A1* 11/2023 Ambroziak ........ B60L 53/64
2023/0378555 A1* 11/2023 Austin ........ B60L 53/68
2023/0378556 A1* 11/2023 Austin ........ H01M 10/44
2023/0387486 A1* 11/2023 Austin ........ B60L 53/68
2023/0396069 A1* 12/2023 Rao ........ H02B 1/056
2023/0415594 A1* 12/2023 Malli Raghavan ........ B60L 53/65
2024/0083285 A1* 3/2024 Trigoso Papoila ........ B60L 53/305
2024/0083298 A1* 3/2024 Quattrini, Jr. ........ B60L 53/63
2024/0204522 A1* 6/2024 Seroff ........ H02J 3/322
2024/0222719 A1* 7/2024 Austin ........ B60L 53/38
2024/0222720 A1* 7/2024 Austin ........ B60L 53/126
2024/0294076 A1* 9/2024 Silorio ........ B60L 53/68
2024/0332649 A1* 10/2024 Austin ........ B60L 53/68
2024/0332650 A1* 10/2024 Austin ........ B60L 53/126
2024/0396100 A1* 11/2024 Austin ........ B60L 53/305
2024/0396101 A1* 11/2024 Austin ........ B60L 53/126
2024/0408986 A1* 12/2024 Reynolds ........ B60L 53/305

FOREIGN PATENT DOCUMENTS

CN 104810894 A 7/2015
EP 2110923 A1 10/2009
EP 2388884 A2 11/2011
EP 2871090 A1 5/2015
EP 3560749 A1 10/2019
JP 05-197892 A 8/1993
JP 2006-020438 A 1/2006
JP 2011-239559 A 11/2011
JP 2015-073431 A 4/2015
KR 10-2010-0036896 A 4/2010
KR 10-2011-0048444 A 5/2011
WO 2008/142431 A1 11/2008
WO 2009/034918 A1 3/2009
WO 2013/144947 A2 10/2013
WO 2022/157658 A2 7/2022

OTHER PUBLICATIONS

Advisory Action Office Action, U.S. Appl. No. 12/508,488, Nov. 30, 2010, 3 pages.
Advisory Action Office Action, U.S. Appl. No. 12/641,285, Mar. 30, 2015, 2 pages.
Chen J.Y., et al., "A Remote Control System for Home Appliances Using the Internet and Radio Connection," 2004 IEEE International Symposium on Computer Aided Control Systems Design, Taipei, Taiwan, Sep. 24, 2004, pp. 249-254.
Communication pursuant to Article 94(3) EPC, EP App. No. 17803633.1, Nov. 13, 2020, 5 pages.
Decision to grant a European patent, EP App. No. 17803633.1, Jun. 10, 2022, 2 pages.
European Search Report and Search Opinion, EP App. No. 17771102.5, Jun. 15, 2020, 8 pages.
European Search Report and Search Opinion, EP App. No. 17803633.1, Dec. 10, 2019, 11 pages.
Extended European Search Report and search Opinion for Application No. 22182902.1, Jan. 19, 2023, 10 pages.
Extended European Search Report and search Opinion for Application No. 22182905.4, Jan. 19, 2023, 12 pages.
Final Office Action from U.S. Appl. No. 12/641,285, Aug. 5, 2011, 11 pages.

(56) References Cited

OTHER PUBLICATIONS

Final Office Action from U.S. Appl. No. 12/641,285, Jul. 30, 2013, 16 pages.
Final Office Action from U.S. Appl. No. 12/641,285, May 18, 2016, 18 pages.
Final Office Action from U.S. Appl. No. 12/641,285, May 19, 2017, 14 pages.
Final Office Action from U.S. Appl. No. 12/641,285, Oct. 22, 2014, 17 pages.
Final Office Action from U.S. Appl. No. 15/078,731, Mar. 29, 2018, 25 pages.
Final Office Action, U.S. Appl. No. 12/508,488, Sep. 14, 2010, 10 pages.
Final Office Action, U.S. Appl. No. 12/641,285, Aug. 5, 2011, 11 pages.
Final Office Action, U.S. Appl. No. 12/641,285, Jul. 30, 2013, 16 pages.
Final Office Action, U.S. Appl. No. 12/641,285, May 18, 2016, 13 pages.
Final Office Action, U.S. Appl. No. 12/641,285, Oct. 22, 2014, 16 pages.
Final Office Action, U.S. Appl. No. 15/078,731, Mar. 29, 2018, 25 pages.
Final Office Action, U.S. Appl. No. 15/882,941, Dec. 12, 2019, 11 pages.
Final Office Action, U.S. Appl. No. 15/882,941, Jun. 23, 2022, 15 pages.
Final Office Action, U.S. Appl. No. 15/882,941, Oct. 21, 2021, 14 pages.
Final Office Action, U.S. Appl. No. 15/882,941, Sep. 25, 2020, 13 pages.
Final Office Action, U.S. Appl. No. 16/215,411, Nov. 25, 2020, 14 pages.
Final Office Action, U.S. Appl. No. 16/215,411, Jan. 14, 2022, 7 pages.
Final Office Action, U.S. Appl. No. 16/215,411, Jun. 11, 2021, 14 pages.
Final Office Action, U.S. Appl. No. 16/995,579, Mar. 4, 2021, 11 pages.
Final Office Action, U.S. Appl. No. 16/995,613, Mar. 9, 2021, 12 pages.
Intention to grant, EP App. No. 17803633.1, Dec. 21, 2021, 5 pages.
Intention to grant, EP App. No. 17803633.1, Dec. 22, 2021, 1 pages.
International Preliminary Report on Patentability, PCT App. No. PCT/US2017/023682, Oct. 4, 2018, 9 pages.
International Preliminary Report on Patentability, PCT App. No. PCT/US2017/034575, Dec. 6, 2018, 12 pages.
International Search Report and Written Opinion for Application No. PCT/US2017/023682, Jun. 19, 2017, 12 pages.
International Search Report and Written Opinion for Application No. PCT/US2017/034575, Aug. 18, 2017, 15 pages.
International Search Report and Written Opinion, PCT App. No. PCT/US2017/023682, Jun. 19, 2017, 10 pages.
International Search Report and Written Opinion, PCT App. No. PCT/US2017/034575, Aug. 18, 2017, 13 pages.
John Yanhao Chen et al., "A Remote Control System for Home Appliances Using the Internet and Radio Connection," 2004 IEEE International Symposium on Computer Aided Control Systems Design, Taipei, Taiwan, Sep. 24, 2004, pp. 249-254.
Non Final Office Action, U.S. Appl. No. 16/215,411, Feb. 19, 2021, 13 pages.
Non-Final Office Action from U.S. Appl. No. 12/641,285, Dec. 17, 2012, 12 pages.
Non-Final Office Action from U.S. Appl. No. 12/641,285, Mar. 27, 2014, 21 pages.
Non-Final Office Action from U.S. Appl. No. 12/641,285, Oct. 7, 2015, 13 pages.
Non-Final Office Action from U.S. Appl. No. 12/641,285, Sep. 22, 2016, 13 pages.
Non-Final Office Action from U.S. Appl. No. 15/078,731, Nov. 20, 2017, 23 pages.
Non-Final Office Action U.S. Appl. No. 16/215,411, Sep. 30, 2021, 14 pages.
Non-Final Office Action, U.S. Appl. No. 12/508,488, Jun. 23, 2010, 11 pages.
Requirement for Restriction/Election, U.S. Appl. No. 17/493,684, Sep. 16, 2022, 5 pages.
Non-Final Office Action, U.S. Appl. No. 12/641,285, Apr. 6, 2011, 11 pages.
Non-Final Office Action, U.S. Appl. No. 12/641,285, Dec. 17, 2012, 12 pages.
Non-Final Office Action, U.S. Appl. No. 12/641,285, Mar. 27, 2014, 21 pages.
Non-Final Office Action, U.S. Appl. No. 12/641,285, Oct. 7, 2015, 13 pages.
Non-Final Office Action, U.S. Appl. No. 12/641,285, Sep. 22, 2016, 13 pages.
Non-Final Office Action, U.S. Appl. No. 15/078,731, Nov. 20, 2017, 17 pages.
Non-Final Office Action, U.S. Appl. No. 15/295,824, Feb. 10, 2017, 11 pages.
Non-Final Office Action, U.S. Appl. No. 15/882,941, Dec. 23, 2022, 16 pages.
Non-Final Office Action, U.S. Appl. No. 15/882,941, Jun. 4, 2019, 12 pages.
Non-Final Office Action, U.S. Appl. No. 15/882,941, Mar. 9, 2022, 15 pages.
Non-Final Office Action, U.S. Appl. No. 15/882,941, Mar. 27, 2020, 13 pages.
Non-Final Office Action, U.S. Appl. No. 15/882,941, Mar. 31, 2021, 13 pages.
Non-Final Office Action, U.S. Appl. No. 15/913,684, Jun. 18, 2018, 23 pages.
Non-Final Office Action, U.S. Appl. No. 16/215,411, Aug. 10, 2020, 14 pages.
Non-Final Office Action, U.S. Appl. No. 16/379,361, Mar. 6, 2020, 9 pages.
Non-Final Office Action, U.S. Appl. No. 16/995,579, Jul. 12, 2021, 5 pages.
Non-Final Office Action, U.S. Appl. No. 16/995,613, Nov. 27, 2020, 8 pages.
Non-Final Office Action, U.S. Appl. No. 17/171,588, Oct. 6, 2022, 19 pages.
Non-Final Office Action, U.S. Appl. No. 17/493,696, Oct. 18, 2022, 7 pages.
Notice of Allowance for U.S. Appl. No. 13/948,879, May 5, 2015, 17 pages.
Notice of Allowance for U.S. Appl. No. 14/298,842, Mar. 31, 2015, 16 pages.
Notice of Allowance from U.S. Appl. No. 14/956,264, Jan. 21, 2016, 18 pages.
Notice of Allowance from U.S. Appl. No. 14/956,264, Jun. 10, 2016, 13 pages.
Notice of Allowance from U.S. Appl. No. 15/078,731, Aug. 1, 2018, 7 pages.
Notice of Allowance, Mar. 31, 2015 for U.S. Appl. No. 14/298,842, filed Jun. 6, 2014.
Notice of Allowance, U.S. Appl. No. 12/508,488, May 12, 2011, 9 pages.
Notice of Allowance, U.S. Appl. No. 12/641,285, Sep. 29, 2017, 11 pages.
Notice of Allowance, U.S. Appl. No. 13/226,422, Mar. 29, 2013, 10 pages.
Notice of Allowance, U.S. Appl. No. 13/948,879, Aug. 28, 2015, 9 pages.
Notice of Allowance, U.S. Appl. No. 13/948,879, May 5, 2015, 11 pages.
Notice of Allowance, U.S. Appl. No. 14/298,842, Jul. 27, 2015, 8 pages.
Notice of Allowance, U.S. Appl. No. 14/298,842, Mar. 31, 2015, 10 pages.

(56) References Cited

OTHER PUBLICATIONS

Notice of Allowance, U.S. Appl. No. 14/956,264, Jan. 21, 2016, 11 pages.
Notice of Allowance, U.S. Appl. No. 14/956,264, Jun. 10, 2016, 9 pages.
Notice of Allowance, U.S. Appl. No. 15/078,731, Aug. 1, 2018, 7 pages.
Notice of Allowance, U.S. Appl. No. 15/295,824, Jul. 14, 2017, 9 pages.
Notice of Allowance, U.S. Appl. No. 15/295,824, Nov. 8, 2017, 8 pages.
Notice of Allowance, U.S. Appl. No. 15/605,857, Dec. 26, 2019, 6 pages.
Notice of Allowance, U.S. Appl. No. 15/605,857, Mar. 18, 2020, 2 pages.
Notice of Allowance, U.S. Appl. No. 15/605,857, Apr. 8, 2020, 6 pages.
Notice of Allowance, U.S. Appl. No. 15/913,684, Nov. 29, 2018, 25 pages.
Notice of Allowance, U.S. Appl. No. 16/215,411, Apr. 29, 2022, 7 pages.
Notice of Allowance, U.S. Appl. No. 16/379,361, Oct. 6, 2020, 8 pages.
Notice of Allowance, U.S. Appl. No. 16/995,579, Aug. 18, 2021, 5 pages.
Notice of Allowance, U.S. Appl. No. 16/995,613, Jun. 17, 2021, 6 pages.
Office Action, EP App. No. 17771102.5, Dec. 19, 2022, 5 pages.
Requirement for Restriction/Election, U.S. Appl. No. 12/508,488, Apr. 30, 2010, 9 pages.
Requirement for Restriction/Election, U.S. Appl. No. 16/215,411, May 18, 2020, 5 pages.
Office Action, EP App. No. 22182902.1, Jan. 5, 2026, 7 pages.

* cited by examiner

DYNAMIC ALLOCATION OF POWER MODULES FOR CHARGING ELECTRIC VEHICLES

CROSS-REFERENCE TO RELATED APPLICATIONS

This application is a continuation of U.S. application Ser. No. 16/995,613, filed Aug. 17, 2020, which is a Divisional of U.S. application Ser. No. 15/605,857, filed May 25, 2017, which claims the benefit of U.S. Provisional Application No. 62/341,567, filed May 25, 2016, which are all hereby incorporated by reference.

FIELD

Embodiments of the invention relate to the field of electric vehicle charging; and more specifically, to the dynamic allocation of power modules for charging electric vehicles.

BACKGROUND

Electric vehicle charging stations, sometimes referred to as EVSE, are used to charge electric vehicles (e.g., electric battery powered vehicles, gasoline/electric battery powered vehicle hybrid, etc.). An EVSE consists of a dispenser that connects to the electric vehicle, and power conversion electronics that may be housed in the dispenser and/or a separate power cabinet. Dispensers may be located in designated charging locations (e.g., similar to locations of gas stations), adjacent to parking spaces (e.g., public parking spaces and/or private parking spaces), etc. Dispensers may not fully be utilized at all times (e.g., an electric vehicle may not be connected to a dispenser or an electric vehicle may be connected to a dispenser but is not charging or is charging very little).

SUMMARY

Dynamic allocation of power modules for charging electric vehicles is described herein. A first dispenser receives a request to initiate charging service for charging an electric vehicle. The first dispenser determines an amount of power that is available for the charging service for charging the electric vehicle including determining an availability status of multiple power modules that are located in the first dispenser and a second dispenser. The first dispenser determines whether the available amount of power is enough to meet a requested or determined amount of power draw of the electric vehicle. If the available amount of power is not enough to meet the requested or determined amount of power draw of the electric vehicle, and if there is at least one of the power modules that is available, the first dispenser requests allocation of the available power module and charging service commences.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

A method and apparatus for dynamically allocating power modules for charging electric vehicles is described herein. The charging system includes multiple electric vehicle charging stations (herein referred to as a dispenser) that each include one or more power modules that can supply power to any one of the dispensers at a time. The allocation of the power modules may be performed dynamically.

Figure 1A:
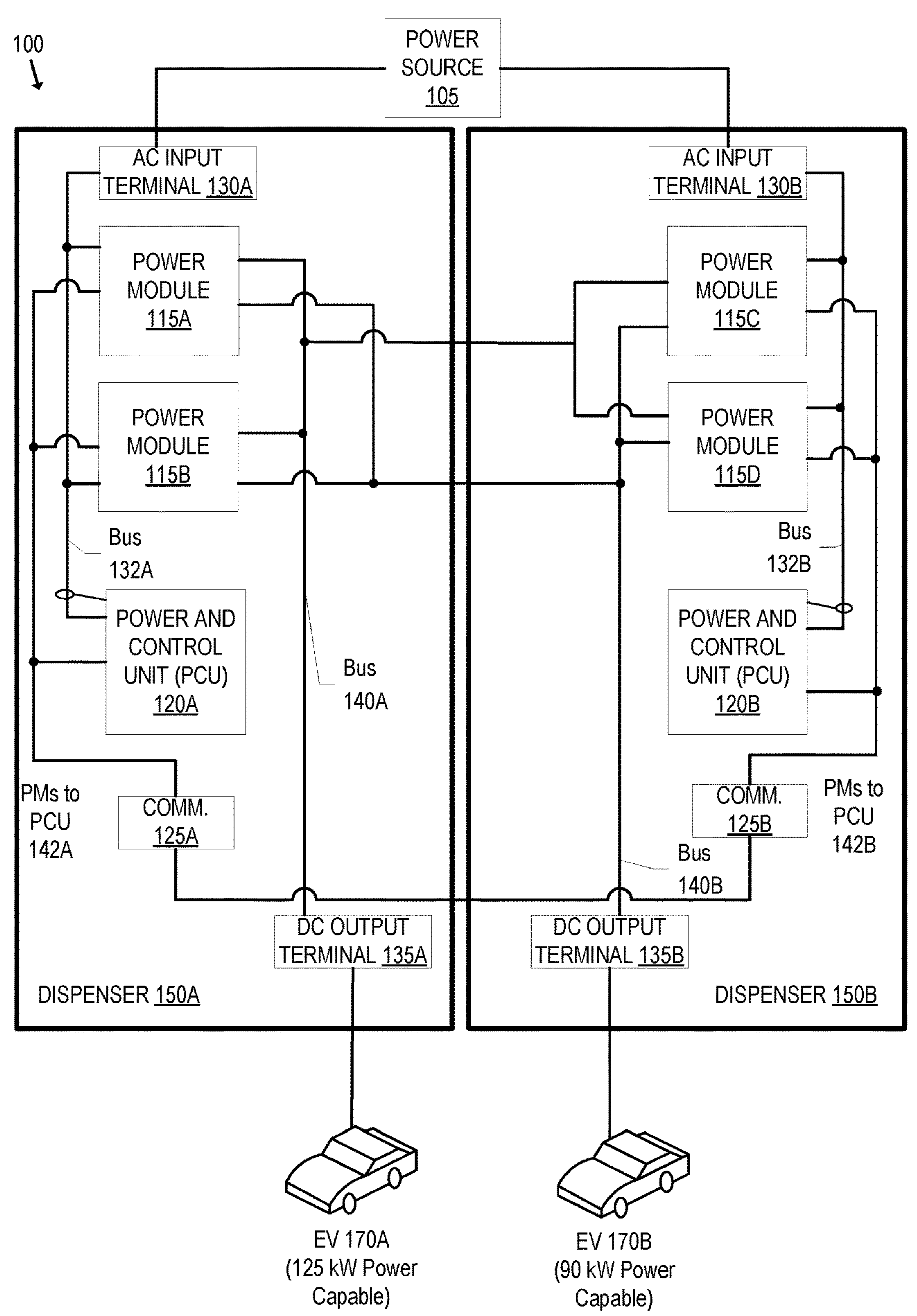
FIG. 1A illustrates an exemplary system for dynamically allocating power modules for charging electric vehicles according to an embodiment.

FIG. 1A illustrates an exemplary system 100 for dynamically allocating power modules for charging electric vehicles according to an embodiment. The system 100 includes a power source 105 that is connected to the dispenser 150A through the AC input terminal 130A and connected to the dispenser 150B through the AC input terminal 130B. The power source 105 may be supplying, for example, 400 VAC/480 VAC, 3 phase. Each dispenser 150 includes a housing that includes one or more power modules. As illustrated in FIG. 1, the dispenser 150A includes the power modules 115A-B, and the dispenser 150B includes the power modules 115C-D. Although FIG. 2 illustrates each of the dispensers 150A-B having two power modules, it should be understood that each dispenser may have fewer power modules or more power modules. Although FIG. 2 illustrates two dispensers, it should be understood that there may be more dispensers that can participate in the dynamic allocation of power modules.

Each of the power modules 115A-D can be used to supply power for charging an electric vehicle(s) to either of the dispensers 150A-B, depending on the allocation of the power modules. Thus, each power module has the ability to supply power to multiple outputs, one output at a time. Each of the power modules 115A-B are coupled with the power and control unit (PCU) 120A over the PMs to PCU 142A, and each of the power modules 115C-D are coupled with the PCU 120B over the PMs to PCU 142B. The dispensers 150A-B can communicate using the communication modules 125A-B respectively. For instance, the communication may be wireless (e.g., Bluetooth, Zigbee, WiFi, etc.) or wired (e.g., Ethernet, Power Line Communication (PLC), etc.).

Each of the power modules 115A-B are switchably connected with the AC input terminal 130A over the bus 132A, and each of the power modules 115C-D are switchably connected with the AC input terminal 130B over the bus 132B. Each of the power modules 115A-B are switchably connected with the DC output terminal 135A over the power bus 140A, and switchably connected with the DC output terminal 135B over the power bus 140B. Similarly, each of the power modules 115C-D are switchably connected with the DC output terminal 135A over the power bus 140A, and switchably connected with the DC output terminal 135B over the power bus 140B. Each of the power modules 115A-D can be switchably connected to only one of the power buses 140A-B at a time. For instance, the power module 115A can be connected to the power bus 140A-B, but cannot be connected to both of the power buses 140A-B at the same time.

In an embodiment, the dispensers 150A-B are coupled with a network. Each of the dispensers 150A-B may be coupled with the network over a wide area network (WAN) link (e.g., cellular (CDMA, GRPS, etc.), WiFi Internet connection, Plain Old Telephone Service, leased line, etc.), or one of the dispensers may be coupled with the network over a WAN link and coupled with the other dispenser over a LAN link (e.g., Wireless Personal Area Network (WPAN) such as Bluetooth, Zigbee, etc., Ethernet, Power Line Communication (PLC), WiFi, etc.) and relay messages between the other dispenser and the network. The network may include one or more servers that provide services for electric vehicle charging such as authorization service, accounting service, and reporting service.

The network may store vehicle operator information (e.g., operator account information, operator contact information (e.g., operator name, street address, email address, telephone number, etc.)), charging session information (e.g., the duration that an EV connected to a dispenser has been charging; the duration that an EV connected to a dispenser has been parked in proximity to the dispenser; the time remaining on each charging session; the type of account associated with each charging session; the amount of current drawn by the EV during the session; the percentage of charge complete of the EV during the session; the percentage of charge remaining of the EV; the battery temperature of the EV during the session; the type of EV during the session; and/or a reservation status of the EV), dispenser configuration information (e.g., the wiring group the dispenser belongs to (as used herein, a wiring group corresponds to the physical wiring connection to the dispenser), the capacity of the wiring group (e.g., the breaker size), and/or a trip margin used to prevent false circuit breaker trips), load supply condition information, and/or power module information (e.g., operating hours of each power module).

Each dispenser 150A-B is configured to control the application of power to the electric vehicles, which may dynamically change as detailed herein. Each dispenser 150A-B is capable of being connected to an electric vehicle such as the electric vehicles 170A-B respectively. The dispensers may support a wired connection for attached charging cords (e.g., with a connector conforming to SAE Electric Vehicle and Plug in Hybrid Electric Vehicle Conductive Charge Coupler (J1772_201602), February 2016 ("SAE J 1772"); a connector conforming to the CHAdeMO protocol) for charging electric vehicles, connector capable of connecting to Tesla Motors™ vehicles, a GB connector, and/or any other connector that attaches to an electric vehicle); and/or wireless charging (e.g., the dispensers may support inductive charging, and/or conductive charging (e.g., pantograph)).

Figure 1B:
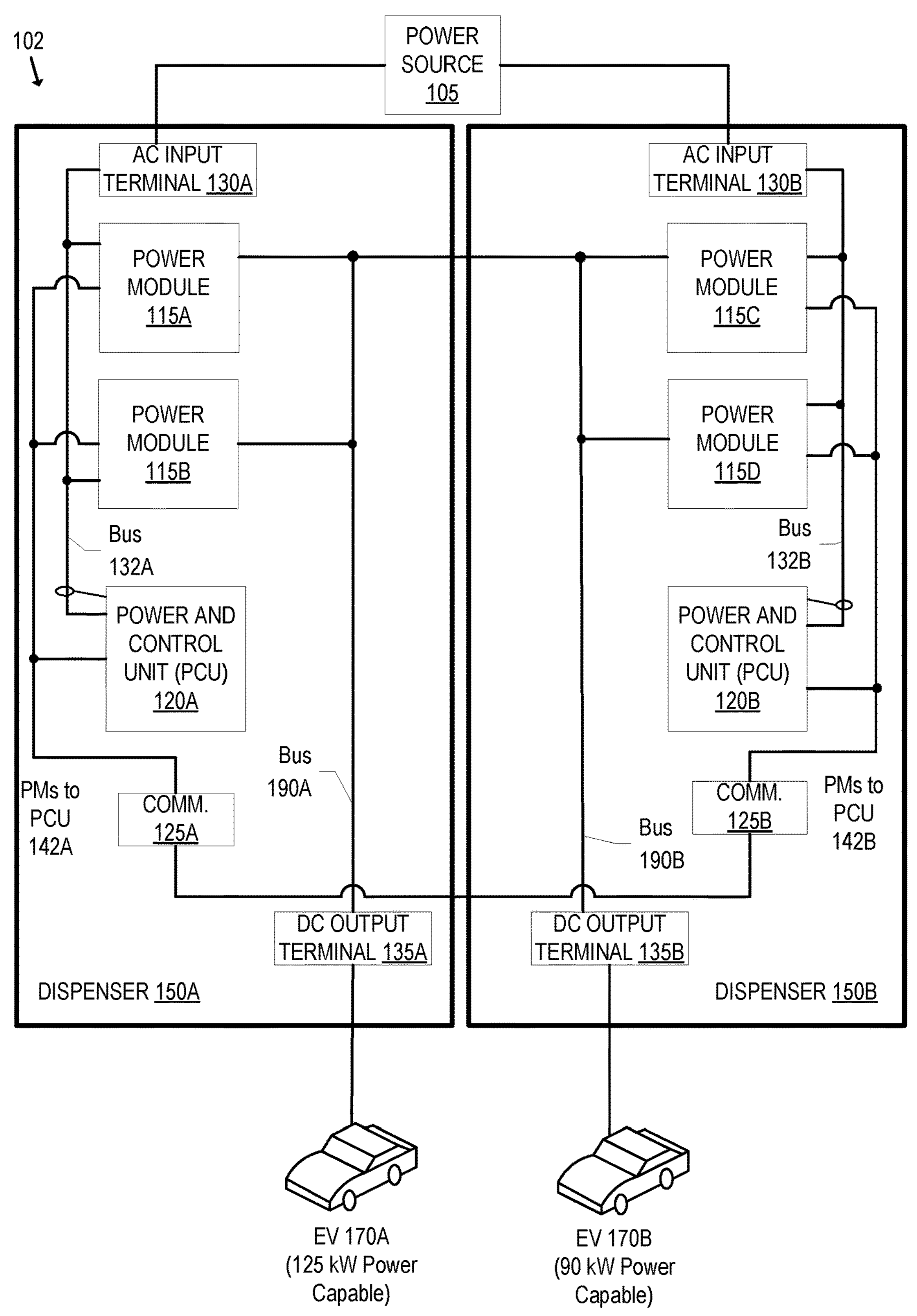
FIG. 1B illustrates an exemplary system for dynamically allocating power modules for charging electric vehicles according to an embodiment.
Figure 2:
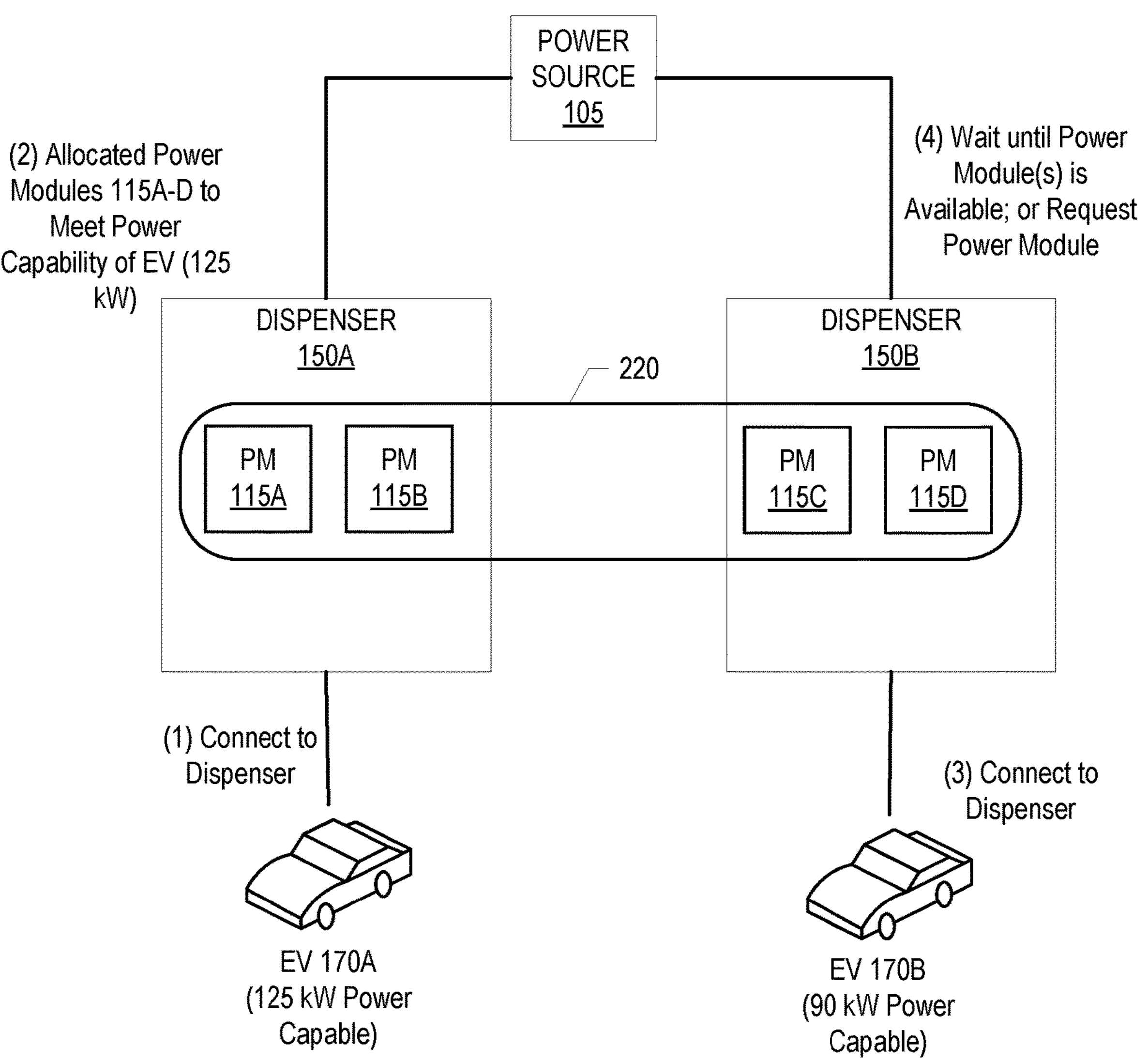
FIG. 2 illustrates an example of allocating power modules according to an embodiment.

FIG. 1B illustrates an exemplary system 102 for dynamically allocating power modules for charging electric vehicles according to an embodiment. The system 102 is similar to the system 100 but instead of having two distinct power buses, the system 102 has a single output bus to the DC output terminals 135A-B (over the bus 190A-B respectively). In such a configuration, either all of the power modules 115A-D are allocated to a single dispenser or none of the power modules are allocated. For instance, either all of the power modules 115A-D can be allocated to the dispenser 150A or none of the power modules 115A-D can be allocated to the dispenser 150A at a given time.

Exemplary Charging Sequence

Charging service typically begins after an electric vehicle is connected to a dispenser and after a charging session has been authenticated. There are a number of different ways in which a charging session can be authenticated. For instance, an electric vehicle operator may request a charging session for their electric vehicle through use of a communication device (e.g., a WLAN or WPAN device such as a one or two-way radio-frequency identification (RFID) device, mobile communication device (e.g., laptops, palmtop, smartphone, multimedia mobile phone, cellular phone, wearable device, etc.). As a specific example, if the dispenser (or device connected to the dispenser such as a payment station) includes an RFID reader, the operator may wave/swipe the mobile communication (if an RFID enabled device) near the RFID reader to request a charging session. The dispenser may forward information read from the RFID reader (e.g., an identifier associated with the electric vehicle operator) to the network for authentication. The network determines whether to grant the charging session and replies to the dispenser with the response (e.g., allowed or denied). Alternatively, the dispenser may locally store authorization information (e.g., a whitelist or blacklist of identifiers) that allows the dispenser to determine whether to authorize the charging session. As another specific example, an electric vehicle operator may use a mobile application on a mobile device to request a charging session on the dispenser. For instance, the operator may select the dispenser using a locator map and then select to request a charging session (typically after logging into the application or otherwise providing user credentials to the application). The network then determines whether to grant the charging session and replies to the dispenser with the response (e.g., allowed or denied). As another example, the dispenser may be configured to allow for automatic authentication. An example of automatic authentication includes ISO 15118 where the electric vehicle operator requests a charging session by connecting their electric vehicle to the dispenser and that electric vehicle communicates an identifier (e.g., the vehicles VIN or other identifying information) that is used by the dispenser and/or the network to determine whether to grant or deny the charging session. Other examples of automatic authentication include use of license plate recognition (the license plate may be read by the dispenser or other device coupled with the dispenser and the number used to determine whether to grant or deny the charging session), facial recognition (the dispenser, or other device coupled with the dispenser, may include a camera to take an image of the electric vehicle operator to determine whether a charging session for the electric vehicle operator should be granted or denied), proximity detection (e.g., WiFi, Bluetooth, Bluetooth LE) that detects whether a mobile device of the electric vehicle operator or the vehicle itself is in proximity to the electric vehicle and use an associated identifier to determine whether to grant or deny the charging session.

The electric vehicle and the dispenser communicate after being connected. The dispenser may advertise the available power to the vehicle, which is sometimes referred to as the maximum available continuous current capacity. This advertisement may take the form of modulating a signal (e.g., a control pilot signal). The amount of power that may be available may be determined by the dispenser based at least in total site feed and/or demand response information received from the network and/or the amount of power allocated from the group of power modules 115A-D. In an embodiment, the electric vehicle may indicate a desired amount of power it wants to draw, which may change throughout the charging cycle (e.g., the electric vehicle may send a current command to the dispenser that the dispenser can use to determine how much power to supply to the electric vehicle).

In an embodiment, to determine the amount of power allocated by the dispensers 150A-B, the requesting dispenser determines the status of the power modules 115A-D. For instance, the requesting dispenser accesses the status of its local power modules and requests the status of the power modules of the other dispenser. As an example, if the dispenser 150A is the requesting dispenser, it may access the status of the power modules 115A-B and request the status of the power modules 115C-D from the dispenser 150B. The status of each power module 115A-D may indicate whether the power module is currently allocated (e.g., whether it is currently connected to a power bus and may indicate which power bus), whether the power module is idle (e.g., not currently connected to a power bus), or whether the power module is offline (e.g., it cannot be contacted). The dispenser may request the status of a power module directly or may send a request to the PCU which then queries the status of the power modules. For instance, the dispenser 150A may request the status of the power modules 115C-D or may send a request to the PCU 120B to query the status of the power modules 115C-D and return the statuses to the dispenser 150A. The status of each power module 115A-D may include an amount of time each power module has been operating. In another embodiment, each dispenser 150A-B periodically shares the status information of its respective power modules 115A-D with each other and/or to the network (e.g., when the state of one of the power modules changes); which is used by the dispensers to determine the amount of power allocated from the group of power modules 115A-D.

The requesting dispenser may determine which, if any, power module, is currently available, using the power module status information. In such an embodiment, the dispenser requests allocation of certain ones of the available power modules so that the dispenser can charge the connected electric vehicle. The requesting dispenser may send a command to each one of the selected available power modules 115A-D directly (which may be relayed by the PCU 120A-B) that instructs the selected power module to switchably connect to the power bus that is connected to the dispenser. For instance, with respect to FIG. 1, the dispenser 150A may cause the selected ones of the power modules 115A-D to switchably connect to the power bus 140A. The dispenser 150A may send a command to the dispenser 150B (e.g., processed by the PCU 120B of the dispenser 150B) that instructs the dispenser 150B to switchably connect the power modules 115C-D to the power bus 140A.

In another embodiment, the requesting dispenser sends a request for power among the dispensers. In response to this request, each power module that is available to be allocated to the dispenser is then allocated. In this embodiment, each available power module (at least of the power module group that can be allocated to the requesting dispenser) is allocated to the requesting power module, regardless of whether the electric vehicle and/or the dispenser can support supplying power to that amount. The amount of power may be more than the dispenser and/or the electric vehicle can support. After the allocation of the available power modules, the dispenser may determine whether to release any of the power modules, such as the excess number of power modules that it does not need.

In a single bus configuration as illustrated in FIG. 1B, the requesting dispenser sends a request for power among the power modules of the dispensers. If all of the power modules are available, the request can be fulfilled and the power modules may be all be allocated to the requesting dispenser. If the power modules are not available, the request cannot be filled and the power modules will not be immediately allocated to the requesting dispenser. If there is more than one dispenser requesting use of the power modules at a time, a time sharing process may be used where the allocation of the power modules take turns between the multiple dispenser.

The amount of power that the power modules 115A-D can supply to the dispensers 150A-B may not be enough to handle the maximum rating of the connected dispensers or the maximum capability of electric vehicles connected to those dispensers. As an example, consider the total amount of power that can be supplied by the power modules 115A-D to be 125 kW, and each of the dispensers 150A-B may be rated to dispense 125 kW. In order to not exceed the power capacity of the group of power modules 115A-D (which may cause a circuit breaker to trip if exceeded), the sum of the power draw of the dispensers 150A-B should be less than or equal to the total amount of power that can be supplied by the power modules 115A-D. As another example, if the EV 170A (capable of drawing 125 kW in this example) and the EV 170B (capable of drawing 90 kW in this example) are simultaneously connected to the dispensers 150A-B, the electric vehicles cannot both receive their maximum capability as that would exceed the total amount of power that can be supplied by the power modules 115A-D.

The allocation of the power modules 115A-D between the dispensers 150A-B can be done differently in different embodiments. For example, the allocation may be done on a first-come first-served basis. As another example, the allocation may be done on a round-robin basis. As another example, the allocation may be done dynamically and be based on a set of one or more factors.

FIG. 2 illustrates an example of allocating power modules according to an embodiment. In the example of FIG. 2, the EV 170A is capable of drawing 125 kW, the EV 170B is capable of drawing 90 kW, and the total amount of power that can be supplied by the power modules 115A-D is 125 kW (each power module being capable of supplying 31.25 kW). The EV 170A arrives and connects to the dispenser 150A at a time 1. At time 1, the EV 170B is not connected to the dispenser 150B. Since at time 1 there are no power modules allocated to either of the dispensers 150A-B and the amount of power that can be supplied by the power modules 115A-B is equal to the capability of the EV 170A, at a time 2, the group of power modules 220 (the power modules 115A-D) are allocated to the dispenser 150A and are capable of supplying the maximum power capability of the EV 170A (125 kW). For instance, the power modules 115A-D are switchably connected to the power bus 140A.

In an embodiment, the dispenser 150A determines that each of the power modules 115A-D are available including accessing the status of the power modules 115A-B (the status of the power modules 115A-B may be stored locally to the dispenser 150A) and requesting the status of the power modules 115C-D. The request may be sent after the EV 170A is connected to the dispenser 150A and after the desired amount of power is determined for the EV 170A. As another example, the request may be sent prior to the EV 170A arriving to the dispenser 150A. For instance, if the EV 170A has a reservation at the dispenser 150A, the dispenser 150A may send the request for power at a time prior to and proximate to the reservation time. If the EV 170A does not show up for the reservation, the dispenser 150A may release the allocated power modules. As another example, through use of telemetry such as the navigation of the EV 170A and/or an app on a mobile device of an EV operator of the EV 170A, the dispenser 150A may send the request for power at a time when the EV 170A is determined to be near the dispenser 150A.

Sometime later, at a time 3, the EV 170B arrives and is connected to the dispenser 150B. At time 3, the EV 170A is still connected to the dispenser 150A and the group of power modules 220 are switchably connected to the power bus 140A. Thus, at time 3, the power modules 115A-D are not available to be allocated to the dispenser 150B. Since there are no remaining available power modules to allocate to the dispenser 150B, at a time 4 the dispenser 150B either waits until a power module 115A-D is available or requests a power module(s) be freed by the dispenser 150A and allocated to the dispenser 150B. If the EV 170A becomes disconnected from the dispenser 150A and/or finishes charging, the group of power modules 220 may become available and switchably disconnected from the power bus 140A.

Figure 3:
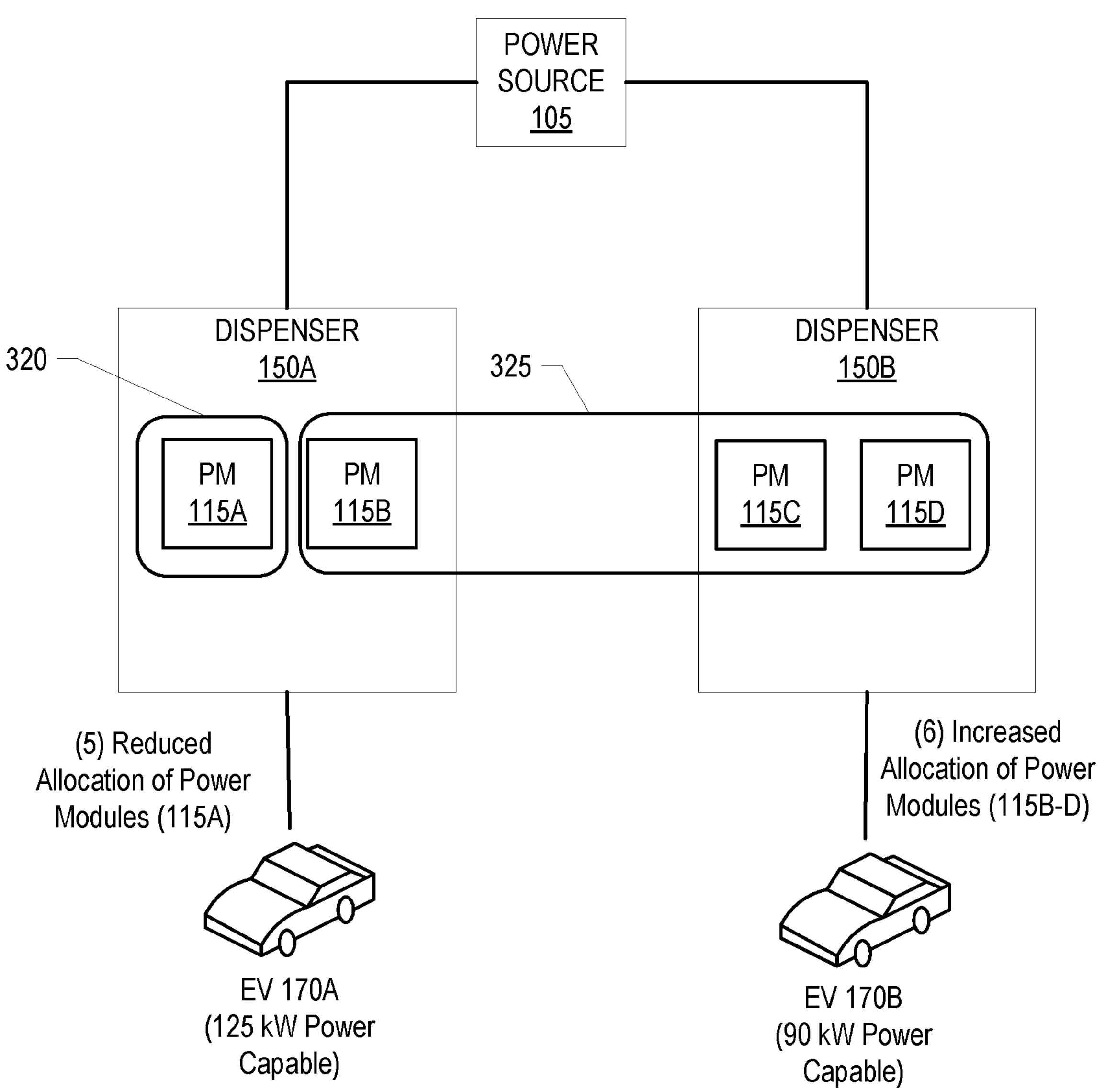
FIG. 3 illustrates an example of allocating power modules dynamically according to an embodiment.

In an embodiment, the allocation of the power modules 115A-D to the dispensers 150A-B is dynamic. For instance, FIG. 3 illustrates an example of allocating power modules dynamically according to an embodiment. The example of FIG. 3 is an extension of the example of FIG. 2. At time 5, the number of power modules allocated to the dispenser 150A is reduced. For instance, the power modules 115B-D, previously allocated to the dispenser 150A, are deallocated from the dispenser 150A (e.g., switchably disconnected from the power bus 140A). The remaining group of power modules 320 (the power module 115A) remain allocated to the dispenser 150A. Thus, the amount of power that is capable of being drawn through the dispenser 150A has been reduced from 125 kW to 31.25 kW. After deallocating the power modules 115B-D from the dispenser 150A, those power modules are available to be allocated to a different dispenser (e.g., the dispenser 150B). At time 6, the number of power modules allocated to the dispenser 150B is increased. For instance, the power modules 115B-D are allocated to the dispenser 150B (e.g., switchably connected to the power bus 140B) and is part of the group of power modules 325 allocated to the dispenser 150B (the power modules 115B-D). Thus, the amount of power that is capable of being drawn through the dispenser 150B has been increased from 0 kW to 93.75 kW.

The decision to dynamically allocate the power modules may be done differently in different embodiments. In an embodiment, the power modules may be allocated across the different dispensers such that each of the dispensers are allocated at least some power modules (assuming that an EV is connected to the dispenser and is ready to accept energy), where the allocation may be on-demand (that is only if an electric vehicle is connected to that dispenser and requesting service). The power module allocation can be dynamically adjusted (either increased or decreased) to a particular dispenser based on a set of one or more factors. The set of factors may include one or more properties of active charging sessions on the dispensers, one or more properties of the dispensers (e.g., the maximum rate of power that can be dispensed by each dispenser, the current rate of power that is being dispensed by each dispenser, the number of dispensers that are requesting to provide charging service, the number of electric vehicle(s) expected to arrive at the dispenser), and load condition information. The one or more properties of the active charging sessions may include one or more of: the duration that each electric vehicle connected to the dispensers has been charging; the duration that each electric vehicle connected to the dispensers has been parked in proximity to the dispensers; the time remaining on each charging session; the type of account associated with each charging session; the amount of current drawn by each electric vehicle connected to the dispensers; the percentage of charge complete of each electric vehicle connected to the dispensers; the percentage of charge remaining of each electric vehicle connected to the dispensers; the battery temperature of each electric vehicle connected to the dispensers; the type of each electric vehicle connected to the dispensers; and a reservation status of each electric vehicle connected to the dispensers.

The duration that the electric vehicles connected to the dispensers have been charging may be taken into consideration when determining how to dynamically allocate power modules between those dispensers. For instance, a dispenser connected to an electric vehicle that has been charging longer may be allocated less power modules than a dispenser connected to an electric vehicle that has been charging relatively lesser.

The duration that the electric vehicles connected to the dispensers have been parked in proximity to the dispenser may be taken into consideration when determining how to dynamically allocate power modules between those dispensers. For instance, a dispenser connected to an electric vehicle that has been parked in proximity to the dispenser longer may be allocated less power modules than a dispenser connected to an electric vehicle that has been parked in proximity to the dispenser for a smaller amount of time.

The time remaining on the charging sessions may be taken into consideration when determining how to dynamically allocate power modules between those dispensers. For instance, the allocation of power modules may prioritize charging sessions that are about to end.

The type of account associated with the charging sessions may be taken into consideration when determining how to dynamically allocate power modules between those dispensers. For example, a charging session associated with an electric vehicle operator that is a member of a loyalty program of the host that owns or controls the dispensers may be prioritized over a charging session associated with an electric vehicle operator that is not a member of the loyalty program. As another example, a charging session associated with an electric vehicle operator that has paid a premium for charging service may be prioritized over a charging session associated with an electric vehicle operator that has not paid a premium for charging service.

The amount of current drawn by the electric vehicles connected to the dispensers may be taken into consideration when determining how to dynamically allocate power modules between those dispensers. For instance, the allocation of power modules may prioritize a dispenser connected to an electric vehicle that has drawn less current than a dispenser connected to an electric vehicle that has drawn more current.

The percentage of charge complete of the electric vehicles connected to the dispensers may be taken into consideration when determining how to dynamically allocate power modules between those dispensers. For instance, the allocation of power modules may prioritize a dispenser connected to an electric vehicle that has a lower percentage of charge complete over a dispenser connected to an electric vehicle that has a higher percentage of charge complete.

The percentage of charge remaining of the electric vehicles connected to the dispensers may be taken into consideration when determining how to dynamically allocate power modules between those dispensers. For instance, the allocation of power modules may prioritize a dispenser connected to an electric vehicle that has a higher percentage of charge remaining over a dispenser connected to an electric vehicle that has a lower percentage of charge remaining.

The battery temperature of the electric vehicles connected to the dispensers may be taken into consideration when determining how to dynamically allocate power modules between those dispensers. Electric vehicles reduce their rate of charge when the battery temperature reaches a certain amount. The allocation of power modules may prioritize a dispenser connected to an electric vehicle that has a lower battery temperature over a dispenser connected to an electric vehicle that has a higher battery temperature.

The type of the electric vehicles connected to the dispensers may be taken into consideration when determining how to dynamically allocate power modules between those dispensers. For instance, the allocation of power modules may prioritize a dispenser connected to a battery only electric vehicle (BEV) over a dispenser connected to a plug-in hybrid electric vehicle (PHEV).

The make and/or model of the electric vehicles connected to the dispensers may be taken into consideration when determining how to dynamically allocate power modules between those dispensers. For instance, the allocation of power modules may prioritize a dispenser connected to an electric vehicle of a certain make and/or model over a dispenser connected to an electric vehicle of a different make and/or model.

A reservation status of the electric vehicles connected to the dispensers may be taken into consideration when determining how to dynamically allocate power modules between those dispensers. For instance, an electric vehicle that has a valid reservation may be prioritized in the power module allocation over an electric vehicle that does not have a valid reservation.

Load supply conditions may be taken into consideration when determining how to dynamically allocate power modules. For instance, in periods of high demand (sometimes referred to as a demand response event), a message may be received that indicates that a reduction of power needs to be made. This may cause the total number of allocated power modules to be decreased until the demand response ends.

The number of electric vehicle(s) expected to arrive at the dispenser(s) may be taken into consideration when determining how to dynamically allocate power modules between those dispensers. For example, if use history of the dispensers indicate that the dispensers are historically busy at a certain time (e.g., morning commute, afternoon commute), the power modules may be allocated between those dispensers to support maximum use of the dispensers (e.g., the power modules may be allocated equally between the dispensers). As another example, the predicted arrival of EVs (e.g., based on state of charge of the EV and vehicle navigation information provided by an in-dash navigation unit and/or an app of a mobile device of an EV operator) may be used to allocate the power modules between those dispensers.

The allocation of power modules may be performed different in different embodiments. In an embodiment, the allocation of power modules is performed by the group of dispensers connected themselves. In another embodiment, the allocation of power modules is performed by a server that is connected with the group of dispensers. In any such embodiment, the entity that determines the allocation of power modules has access to information that allows it to determine whether to dynamically adjust the allocation of power modules. This information (e.g., duration that each electric vehicle connected to the dispensers has been charging; duration that each electric vehicle connected to the dispensers has been parked in proximity to the dispensers; the time remaining on each charging session; the type of account associated with each charging session; the amount of current drawn by each electric vehicle connected to the dispensers; the percentage of charge complete of each electric vehicle connected to the dispensers; the percentage of charge remaining of each electric vehicle connected to the dispensers; the battery temperature of each electric vehicle connected to the dispensers; the type of each electric vehicle connected to the dispensers; a reservation status of each electric vehicle connected to the dispensers; the amount of power presently allocated to each dispenser (or the number of power modules presently allocated to each dispenser); the rate of power being dispensed by each dispenser; the number of electric vehicle(s) expected to arrive at the dispenser(s); and/or load condition information) may be stored and/or communicated between the group of dispensers themselves and/or the network.

In an embodiment where the group of dispensers determine how to allocate the power modules, upon a dispenser receiving a request for charging service (e.g., an electric vehicle becomes connected to the dispenser), the dispenser determines the status of the power modules as previously described. The status may also include an amount of time each power module has been operating. The dispenser uses the status information of the power modules when determining how to allocate the power modules.

Figure 4:
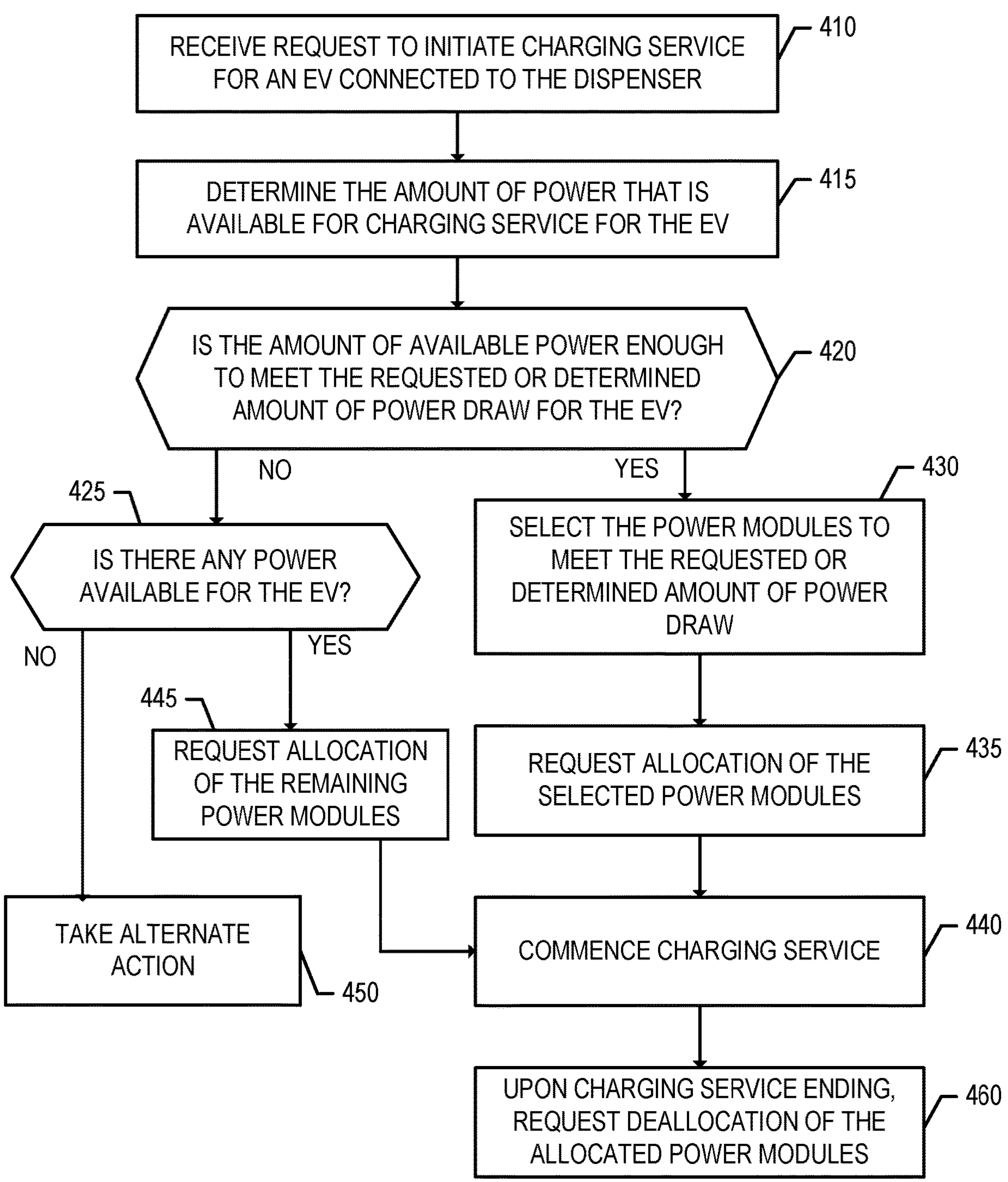
FIG. 4 is a flow diagram that illustrates exemplary operations for allocating power modules according to an embodiment.

FIG. 4 is a flow diagram that illustrates exemplary operations for allocating power modules according to an embodiment. The operations of FIG. 4 will be described with respect to the exemplary embodiments of the other figures. However, it should be understood that the operations of FIG. 4 can be performed by embodiments other than those discussed with reference to the other figures, and the embodiments discussed with reference to these other figures can perform operations different than those discussed with reference to FIG. 4.

At operation 410, a dispenser receives a request to initiate charging service for an electric vehicle that is connected to the dispenser. Different electric vehicles may desire to draw different amount of power. With respect to FIG. 1, for example, the EV 170A is capable of drawing 125 kW and the EV 170B is capable of drawing 90 kW. The request to initiate charging service may indicate the desired amount of power draw. An electric vehicle operator may specify the desired amount of power draw. In an embodiment, the desired amount of power draw may be determined based on the model/make of the electric vehicle (which may be stored in association with an account of the electric vehicle operator requesting the charging service). In an embodiment, the electric vehicle transmits the requested power draw to the dispenser. Flow then moves to operation 415.

At operation 415, the dispenser determines the amount of power that is available for charging service for the electric vehicle. For example, the dispenser 150A may access the status of the power modules 115A-B and request the status of the power modules 115C-D from the dispenser 150B. The dispenser 150A may send the status request to the PCU 120B which then queries the status of the power modules 115C-D and returns the statuses to the dispenser 150A. The status of each power module 115A-D may include an amount of time each power module has been operating. The status of each power module 115A-D may indicate the amount of power that can be supplied by that power module. In another embodiment, the status information of the power modules 115A-D is locally available to the dispenser 150A (e.g., the dispenser 150B may periodically send status information of the power modules 115C-D such as when the state of those power modules change) and/or available on the network. Next, flow moves to operation 420.

At operation 420, the dispenser determines whether the amount of available power for charging the electric vehicle is enough to meet the requested or determined amount of power draw of the electric vehicle. For instance, the dispenser compares the amount of available power for charging the electric vehicle with the requested or determined amount of power draw for the electric vehicle. If there is enough available power for charging the electric vehicle, then flow moves to operation 430. If there is not enough available power for charging the electric vehicle, then flow moves to operation 425. For instance, in FIG. 2, there are enough power modules available to fully meet the power capability of the EV 170A when it is the only EV that is drawing power from the power modules 115A-D.

At operation 430, the dispenser selects the power modules to meet the requested or determined amount of power draw. In an embodiment, the dispenser only selects the power modules that have a status of available. That is, the dispenser does not select from a power module that is currently allocated to another dispenser. From the available power modules, the dispenser may select those power module(s) that have the relatively lowest operating time. The dispenser may transmit the identification of the selected power modules to the other dispenser(s) connected and/or to the network. Flow then moves to operation 435. In another embodiment, instead of the dispenser selecting the power modules, the dispenser requests a number of power modules from the network and the network selects the requested number of power modules and causes them to be allocated accordingly.

At operation 435, the dispenser requests allocation of the selected power modules. The requesting dispenser causes the selected power module to switchably connect to the power bus that is connected to the dispenser. For instance, with respect to FIG. 1, the dispenser 150A may cause the power modules 115A-B to switchably connect to the power bus 140A and send a command to the dispenser 150B to cause the power modules 115C-D to switchably connect to the power bus 140A. Flow then moves to operation 440 where charging service commences.

Flow moves from operation 440 to operation 460 where upon charging service ending, the dispenser requests deallocation of the allocated power modules. The charging service may end as a result of the charging session ending (e.g., the electric vehicle being disconnected from the dispenser). The requesting dispenser may send a command to each one of the allocated power modules directly (which may be relayed by the PCU) that causes the allocated power module to switchably disconnect from the power bus that is connected to the dispenser. For instance, with respect to FIG. 1, the dispenser 150A cause the power modules 115A-B to switchably disconnect from the power bus 140A and send a command to the dispenser 150B to cause the power modules 115C-D to switchably disconnect from the power bus 140A. As another example, the requesting dispenser may send a command to the network that indicates that the dispenser has finished charging service and any allocated power module(s) may be deallocated from the dispenser 150B. In an embodiment, when a power module is deallocated, it may be switchably disconnected from the power bus immediately. In another embodiment, when a power module is deallocated, it is not switchably disconnected from the power bus unless and until a determination has been made to allocate that power module to another dispenser.

At operation 425, the dispenser determines whether there is any power available for charging of the electric vehicle. If there is, then flow moves to operation 445 where the dispenser requests allocation of the remaining power modules, in a similar way as described with respect to operation 435. Flow then moves from operation 445 to operation 440. If there is not any power available, then flow moves to operation 450 where an alternative action is taken.

One alternative action is to wait until there is power available for charging the EV. The dispenser may periodically determine the status of each power module to determine when there is power available for charging the EV. Alternatively, the other dispenser(s) that have been allocated power module(s) may periodically send status information of the power modules to the dispenser and/or to the network that can be accessed or transmitted to the dispenser.

Another alternative action is a dynamic allocation of the power modules where one or more power modules are deallocated from a different dispenser and allocated to the requesting dispenser. The dynamic allocation may be based on a set of one or more factors as previously described, and a set of predefined allocation rules. In an embodiment, the dynamic allocation of the power modules is performed by the group of dispensers themselves. In another embodiment, the dynamic allocation of power modules is performed by a server that is connected with the group of dispensers.

Figure 5:
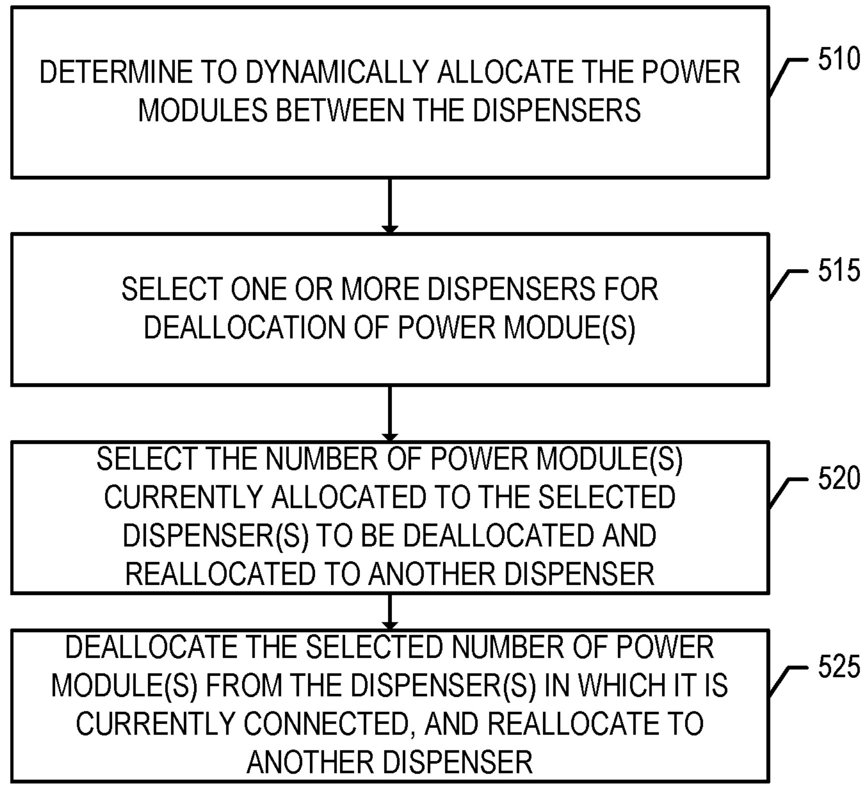
FIG. 5 is a flow diagram that illustrates exemplary operations for dynamic allocation of the power modules according to an embodiment.

FIG. 5 is a flow diagram that illustrates exemplary operations for dynamic allocation of the power modules according to an embodiment. The operations of FIG. 5 will be described with respect to the exemplary embodiments of the other figures. However, it should be understood that the operations of FIG. 5 can be performed by embodiments other than those discussed with reference to the other figures, and the embodiments discussed with reference to these other figures can perform operations different than those discussed with reference to FIG. 5.

At operation 510, a determination has been made to dynamically allocate the power modules between the dispensers. The determination to dynamically allocate the power modules may be made as a result of the sum of the requested power draw of the connected dispensers exceeding the maximum amount supported by the group of power modules. In an embodiment, a dispenser that is allocated a power module is periodically checked whether it is utilizing its allocated power module(s), and if it is not utilizing its allocated power module(s), those power module(s) are deallocated and allocated to a different dispenser (if that dispenser has need for those power module(s)). For instance, an electric vehicle may ramp down its power usage as it is nearing charging completion, although it may still be connected to the dispenser. In such a situation, that EV may not need some or all of the power modules that are currently allocated to the dispenser for the EV. In an embodiment, the EV may indicate to the dispenser the rate of power that it currently desires (e.g., the EV may send a current command to the dispenser that can be used to determine how much power to supply to the EV). In another embodiment, the rate of power that is being dispensed through an EV is measured, and that measured amount is compared against the allocated power amount to determine whether the allocated power module(s) are being utilized. The metrology component may be included within each dispenser or coupled with each dispenser.

Next, at operation 515, one or more of the dispensers that are currently allocated one or more power modules are selected to have one or more power modules be deallocated and reallocated to a different dispenser. Next, at operation 520, the number of power module(s) currently allocated to the selected dispenser(s) to be deallocated and reallocated to a different dispenser is determined. The decision to select a dispenser for power module deallocation, and/or the selection of the number of power module(s) to be deallocated, may take into consideration one or more factors, such as the duration that each electric vehicle connected to the dispensers has been charging; the duration that each electric vehicle connected to the dispensers has been parked in proximity to the dispensers; the time remaining on each charging session; the type of account associated with each charging session; the amount of current drawn by each electric vehicle connected to the dispensers; the percentage of charge complete of each electric vehicle connected to the dispensers; the percentage of charge remaining of each electric vehicle connected to the dispensers; the battery temperature of each electric vehicle connected to the dispensers; the type of each electric vehicle connected to the dispensers; a reservation status of each electric vehicle connected to the dispensers; the amount of power presently allocated to each dispenser (or the number of power modules presently allocated to each dispenser); the rate of power being dispensed by each dispenser; the number of electric vehicle(s) expected to arrive at the dispenser(s); and/or load condition information. Flow moves from operation 520 to operation 525.

At operation 525, the selected number of power module(s) for deallocation are deallocated from dispenser(s) in which it is currently connected, and reallocated to another dispenser. For example, with reference to FIG. 3, the power modules 115B-D that were previously allocated to the dispenser 150A are deallocated (e.g., switchably disconnected from the power bus 140A) and allocated to the dispenser 150B (e.g., switchably connected to the power bus 140B). To deallocate a power module from a dispenser, a message may be sent from the dispenser to that power module directly (which may be relayed by the PCU) that instructs the power module to switchably disconnect from the power bus. That dispenser may also instruct the power module to be allocated to a different dispenser. Alternatively, the dispenser that is deallocating the power module may send a message to the dispenser that will be allocated that power module that indicates that the power module has been instructed to be disconnected. The dispenser that will be allocated that power module may then send a message to the power module that causes the power module to be switchably connected to the power bus connecting the dispenser with its output.

In an embodiment, a dispenser sends a request for power and the available power modules are allocated to the dispenser, regardless of whether the amount of allocated power exceeds the requested or supported amount of power. If the dispenser is allocated an excess amount of power, the dispenser releases the excess power module(s) so that they can be allocated to a different dispenser.

Figure 6:
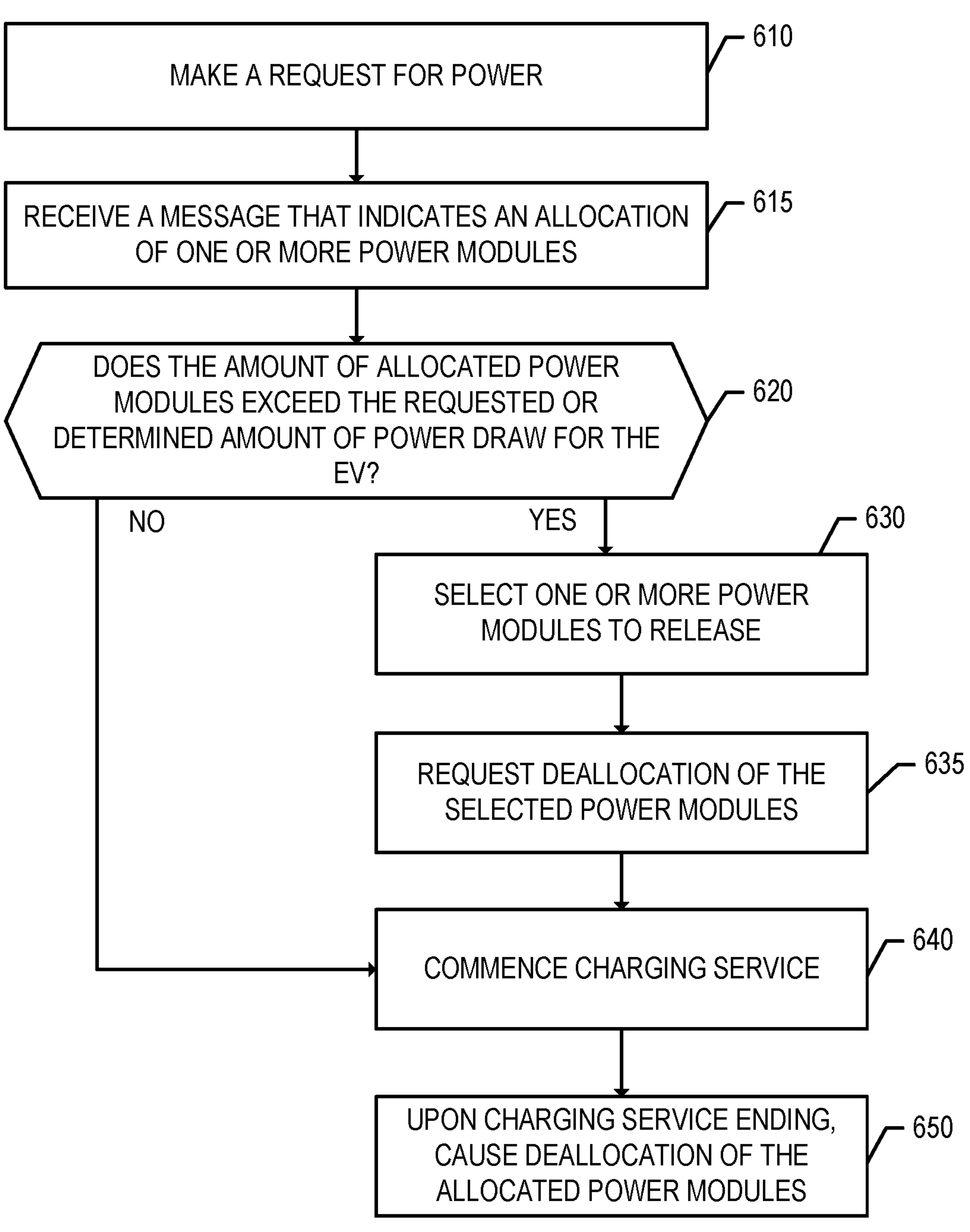
FIG. 6 is a flow diagram that illustrates exemplary operations for allocating power modules according to another embodiment.

FIG. 6 is a flow diagram that illustrates exemplary operations for allocating power modules according to an embodiment. The operations of FIG. 6 will be described with respect to the exemplary embodiments of the other figures. However, it should be understood that the operations of FIG. 6 can be performed by embodiments other than those discussed with reference to the other figures, and the embodiments discussed with reference to these other figures can perform operations different than those discussed with reference to FIG. 6.

At operation 610, a dispenser makes a request for power. The request may be made in reaction to an electric vehicle being connected to the dispenser. Alternatively, the request may be made proactively such as based upon a reservation time of the dispenser nearing (within a predetermined time of the reservation time) or through determining a likelihood that an electric vehicle will be arriving at the dispenser (e.g., through history of use or through use of navigation and state of charge of the EV). The request for power may be sent to each of the dispensers that share power modules and/or to the network. Any available power modules will be allocated to the requesting dispenser in this example.

Next, at operation 615, the dispenser receives a message that indicates an allocation of one or more power modules. The message may include information about the allocated power modules (e.g., an identifier of each power module that has been allocated to the dispenser, an amount of time each allocated power module has been operating, and/or the amount of power that can be dispensed by each allocated power module).

The number of power modules and corresponding power may exceed the requested/determined or supported amount of power draw from the electric vehicle connected to the dispenser or expected to be connected to the dispenser. At operation 620, the dispenser determines whether the number of allocated power modules exceed the requested or determined amount of power draw for the electric vehicle. For instance, the dispenser compares the amount of allocated power with the requested or determined amount of power draw for the electric vehicle. For instance, with respect to FIG. 2, if the dispenser 150A is initially allocated all of the power modules 115A-D and each is capable of supplying 31.25 kW (a total of 125 kW), the total amount of power (125 kW) does not exceed the amount of power that is capable of being drawn by the EV 170A (125 kW). If the amount of allocated power modules exceed the requested or determined amount of power draw for the EV, then flow moves to operation 630. If the amount of allocated power modules does not exceed the requested or determined amount of power draw for the EV, then flow moves to operation 640.

At operation 630, the dispenser selects one or more power modules to release such that the total amount of power does not exceed the requested or determined amount of power draw for the EV. In an embodiment, the dispenser selects the power modules to release that have the most amount of operating hours. Flow then moves to operation 635 where the dispenser causes the deallocation of the selected power modules. For those selected power module(s) that are included within the dispenser, the dispenser may switchably disconnect those power module(s) from the power bus. For those selected power module(s) that are included in another dispenser, a command may be sent to the other dispenser that instructs that dispenser to switchably disconnect those power module(s) from the power bus. In an embodiment, when a power module is deallocated, it may be switchably disconnected from the power bus immediately. In another embodiment, when a power module is deallocated, it is not switchably disconnected from the power bus unless and until a determination has been made to allocate that power module to another dispenser. Flow then moves to operation 640, where charging service commences. In an embodiment, commencing of the charging service of operation 640 may be prior to the operation 630. Flow moves from operation 640 to operation 650.

At operation 650, upon charging service ending, the dispenser causes the deallocation of the allocated power modules. The charging service may end as a result of the charging session ending (e.g., the electric vehicle being disconnected from the dispenser). For those power module(s) that are included within the dispenser, the dispenser may switchably disconnect those power module(s) from the power bus. For those selected power module(s) that are included in another dispenser, a command may be sent to the other dispenser that instructs that dispenser to switchably disconnect those power module(s) from the power bus. In an embodiment, when a power module is deallocated, it may be switchably disconnected from the power bus immediately. In another embodiment, when a power module is deallocated, it is not switchably disconnected from the power bus unless and until a determination has been made to allocate that power module to another dispenser.

At any time after the charging service has commenced or after the power modules have been allocated, a dynamic reallocation of power modules may be performed, such as described with respect to FIG. 5.

Selecting Power Module(s) for Allocation

As previously described herein, the number of power module(s) that are allocated to dispenser(s) may be determined dynamically. In an embodiment, the particular power module(s) that will be selected for allocation is dynamically determined. For instance, the selection of power module(s) for allocation may be performed according to a load balancing algorithm such that the usage amongst the power modules is roughly equal. This helps preventing a power module from wearing out faster than others due to overuse. In an embodiment, upon determining that a power module is to be allocated to a dispenser, the operating hours of the available power modules is determined and the power module with the lowest amount of operating hours is selected for allocation.

Deallocating a Power Module

Reference has been made herein to deallocating a power module. In an embodiment, deallocating a power module includes disconnecting the power module from the power bus in which it is currently connected. A deallocated power module is then available to be allocated. In another embodiment, deallocating a power module does not include disconnecting the power module from the power bus in which it is currently connected unless and until a determination has been made to allocate that power module to another dispenser.

Dispenser

Figure 7:
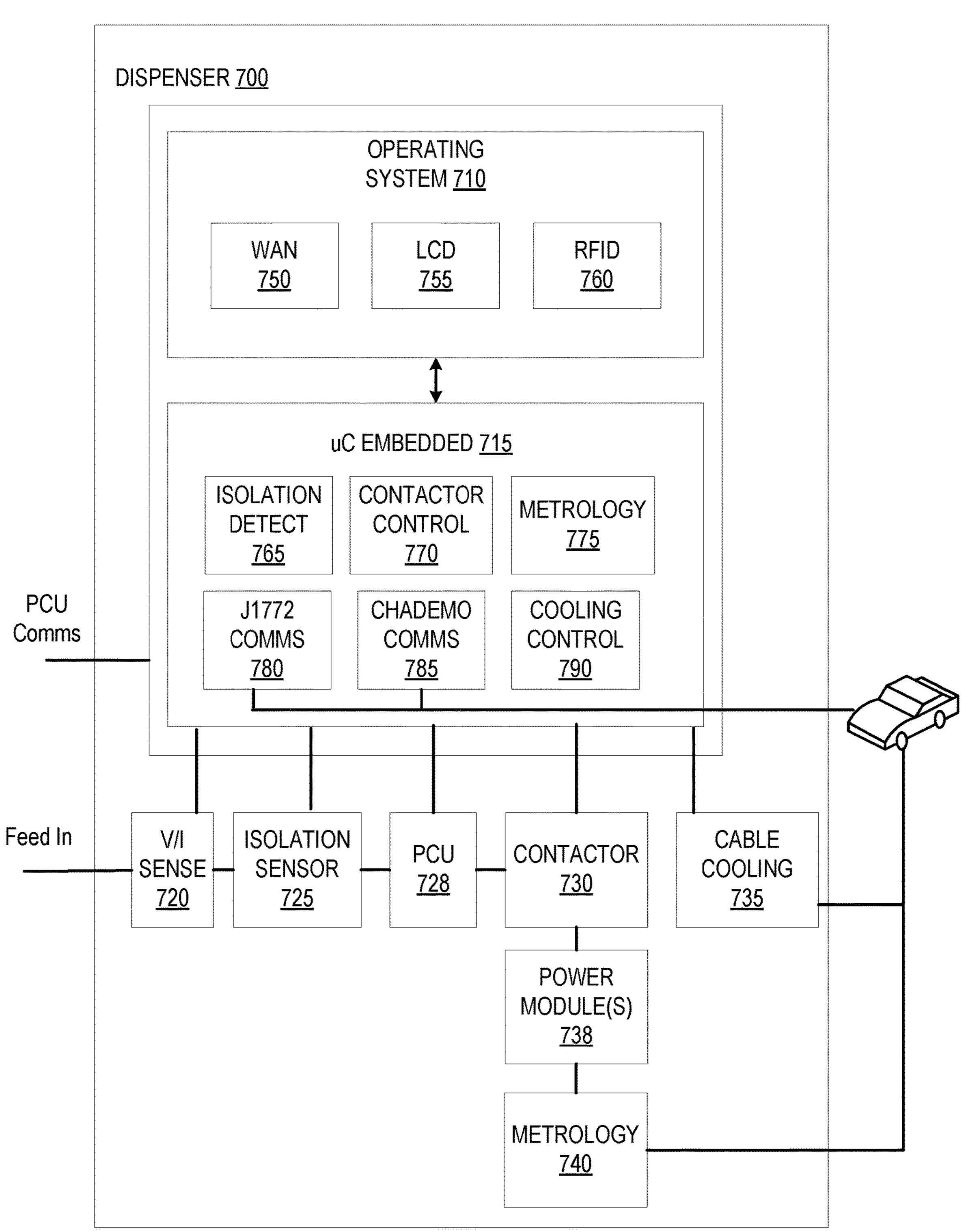
FIG. 7 illustrates an exemplary dispenser according to an embodiment.

FIG. 7 illustrates an exemplary dispenser according to an embodiment. The dispensers 150A-B may take the form of the dispenser 700. The dispenser 700 includes the operating system 710 that is coupled with the embedded microcontroller 715. The operating system 710 manages certain hardware and software for the dispenser 700 such as the WAN module 750 to manage a wide area network (WAN) connection for the dispenser 700, the LCD module 755 to manage a display of the dispenser 700, and the RFID module 760 that manages an RFID transceiver of the dispenser 700. The embedded microcontroller 715 executes the isolation detect module 765, the contactor control module 770, the metrology module 775, the J1772 communications module 780, the CHAdeMO communications module 785, and the cooling control module 790. Of course, it should be understood that the dispenser may include more, less, or different communication modules for communicating with different vehicle types.

The isolation detect module 765 manages the isolation sensor 725 to detect whether the circuits are isolated. For instance, with respect to a DC output, rail isolation is the resistance between each DC rail and ground including any measuring device, and total isolation is the parallel combination of both rail isolation values. The dispenser 700 will terminate a charge when the isolation of either rail to ground is under a certain amount. The PCU 728 manages the dynamic allocation of the power module(s) 738, as previously described herein. The contactor control module 770 manages the contactor 730 including causing the contactor 730 to open and close as appropriate. The V/I sense component 720 senses the current and voltage and provides the sensed data to the embedded microcontroller 715.

The metrology module 775 manages the metrology component 740 that meters electrical usage (e.g., drawn by the electric vehicle). The J1772 communications module 780 handles communications between the dispenser 700 and an electric car according to the J1772 standard. The CHAdeMO communications module 785 handles communications between the dispenser 700 and an electric car according to the CHAdeMO standard.

The cooling control module 790 manages the cooling of the dispenser 700 including managing the cable cooling component 735. The cable cooling component 735 may control a liquid cable cooling system, and may monitor and control the flow rate, pressure, inlet, outlet temperature, cable temperature, and/or connector temperature of the charging cable.

The techniques shown in the figures can be implemented using code and data stored and executed on one or more electronic devices (e.g., a dispenser, a server). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

The term "coupled," along with its derivatives, may be used in this description. "Coupled" is used to indicate that two or more elements, which may or may not be in direct physical or electrical contact with each other, co-operate or interact with each other.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a first dispenser, comprising:

receiving a first request to initiate charging service for charging a first electric vehicle through the first dispenser;

determining a first amount of power that is available for the charging service for charging the first electric vehicle, wherein determining the first amount of power that is available for the charging service for charging the first electric vehicle includes determining an availability status of each of a plurality of power modules, wherein a first portion of the plurality of power modules is located in the first dispenser and a second portion of the plurality of power modules is located in a second dispenser;

determining whether the determined first amount of power that is available for the charging service for charging the first electric vehicle is enough to meet a requested or determined amount of power draw of the first electric vehicle;

responsive to determining that the determined first amount of power is not enough to meet the requested or determined amount of power draw of the first electric vehicle, and responsive to determining that there is at least one of the plurality of power modules that is available, requesting allocation of that at least one of the plurality of power modules that is available, wherein each of the plurality of power modules is configured to be allocated to only one of the first dispenser or the second dispenser at a time; and commencing charging service for charging the first electric vehicle after the at least one of the plurality of power modules that is available is allocated to the first dispenser.

2. The method of claim 1, further comprising:

responsive to charging service for charging the first electric vehicle ending, requesting the at least one of the plurality of power modules that is available to be deallocated.

3. The method of claim 1, wherein determining the availability status of each of the plurality of power modules is performed locally at the first dispenser.

4. The method of claim 1, wherein determining the availability status of each of the plurality of power modules includes requesting the availability status of the second portion of the plurality of power modules from the second dispenser.

5. The method of claim 1, wherein requesting allocation of that at least one of the plurality of power modules that is available includes selecting that at least one of the plurality of power modules that is available that has a lowest operating time.

6. The method of claim 1, wherein that at least one of the plurality of power modules is located on the second dispenser, and wherein requesting allocation of that at least one of the plurality of power modules that is available causes the second dispenser to cause that at least one of the plurality of power modules to connect to a power bus that connects to an output terminal for charging the first electric vehicle.

7. A first dispenser for charging an electric vehicle, comprising:

a first set of one or more power modules, wherein each of the first set of one or more power modules is capable of supplying an amount of power for charging the electric vehicle;

a processor; and a non-transitory machine-readable storage medium that stores instructions that, when executed by the processor, cause the processor to perform operations comprising:

receiving a first request to initiate charging service for charging a first electric vehicle through the first dispenser, determining a first amount of power that is available for the charging service for charging the first electric vehicle, wherein determining the first amount of power that is available for the charging service for charging the first electric vehicle includes determining an availability status of each of a plurality of power modules including the first set of one or more power modules and a second set of one or more power modules located in a second dispenser that is remote to the first dispenser, determining whether the determined first amount of power that is available for the charging service for charging the first electric vehicle is enough to meet a requested or determined amount of power draw of the first electric vehicle, responsive to determining that the determined first amount of power is not enough to meet the requested or determined amount of power draw of the first electric vehicle, and responsive to determining that there is at least one of the plurality of power modules that is available, requesting allocation of that at least one of the plurality of power modules that is available, wherein each of the plurality of power modules is configured to be allocated to only one of the first dispenser or the second dispenser at a time, and commencing charging service for charging the first electric vehicle after the at least one of the plurality of power modules that is available is allocated to the first dispenser.

8. The first dispenser of claim 7, wherein the operations further comprise:

responsive to charging service for charging the first electric vehicle ending, requesting the at least one of the plurality of power modules that is available to be deallocated.

9. The first dispenser of claim 7, wherein determining the availability status of each of the plurality of power modules is performed locally at the first dispenser.

10. The first dispenser of claim 7, wherein determining the availability status of each of the plurality of power modules includes requesting the availability status of the second set of one or more power modules from the second dispenser.

11. The first dispenser of claim 7, wherein requesting allocation of that at least one of the plurality of power modules that is available includes selecting that at least one of the plurality of power modules that is available that has a lowest operating time.

12. The first dispenser of claim 7, wherein that at least one of the plurality of power modules is located on the second dispenser, and wherein requesting allocation of that at least one of the plurality of power modules that is available causes the second dispenser to cause that at least one of the plurality of power modules to connect to a power bus that connects to an output terminal for charging the first electric vehicle.

13. A non-transitory machine-readable storage medium that provides instructions that, when executed by a processor on a first dispenser, cause the processor to perform operations comprising:

receiving a first request to initiate charging service for charging a first electric vehicle through the first dispenser;

determining a first amount of power that is available for the charging service for charging the first electric vehicle, wherein determining the first amount of power that is available for the charging service for charging the first electric vehicle includes determining an availability status of each of a plurality of power modules, wherein a first portion of the plurality of power modules is located in the first dispenser and a second portion of the plurality of power modules is located in a second dispenser;

determining whether the determined first amount of power that is available for the charging service for charging the first electric vehicle is enough to meet a requested or determined amount of power draw of the first electric vehicle;

responsive to determining that the determined first amount of power is not enough to meet the requested or determined amount of power draw of the first electric vehicle, and responsive to determining that there is at least one of the plurality of power modules that is available, requesting allocation of that at least one of the plurality of power modules that is available, wherein each of the plurality of power modules is configured to be allocated to only one of the first dispenser or the second dispenser at a time; and commencing charging service for charging the first electric vehicle after the at least one of the plurality of power modules that is available is allocated to the first dispenser.

14. The non-transitory machine-readable storage medium of claim 13, wherein the operations further comprise:

responsive to charging service for charging the first electric vehicle ending, requesting the at least one of the plurality of power modules that is available to be deallocated.

15. The non-transitory machine-readable storage medium of claim 13, wherein determining the availability status of each of the plurality of power modules is performed locally at the first dispenser.

16. The non-transitory machine-readable storage medium of claim 13, wherein determining the availability status of each of the plurality of power modules includes requesting the availability status of the second portion of the plurality of power modules from the second dispenser.

17. The non-transitory machine-readable storage medium of claim 13, wherein requesting allocation of that at least one of the plurality of power modules that is available includes selecting that at least one of the plurality of power modules that is available that has a lowest operating time.

18. The non-transitory machine-readable storage medium of claim 13, wherein that at least one of the plurality of power modules is located on the second dispenser, and wherein requesting allocation of that at least one of the plurality of power modules that is available causes the second dispenser to cause that at least one of the plurality of power modules to connect to a power bus that connects to an output terminal for charging the first electric vehicle.

* * * * *